United States Patent
Min et al.

(10) Patent No.: US 12,495,218 B2
(45) Date of Patent: Dec. 9, 2025

(54) IMAGE SIGNAL PROCESSOR SUPPORTING IMAGE INTERPOLATION AND IMAGE PROCESSING METHOD USING THE SAME

(71) Applicant: Samsung Electronics Co., Ltd., Suwon-si (KR)

(72) Inventors: Dongki Min, Suwon-si (KR); Keunyung Byun, Suwon-si (KR); Tae-Shick Wang, Suwon-si (KR); Jongmin You, Suwon-si (KR); Chanyoung Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 12 days.

(21) Appl. No.: 18/437,596

(22) Filed: Feb. 9, 2024

(65) Prior Publication Data
US 2024/0397212 A1    Nov. 28, 2024

(30) Foreign Application Priority Data

May 24, 2023   (KR) .................. 10-2023-0067281
Aug. 21, 2023  (KR) .................. 10-2023-0109357

(51) Int. Cl.
*H04N 23/84*    (2023.01)
*G06T 5/20*    (2006.01)
(Continued)

(52) U.S. Cl.
CPC ............ *H04N 23/843* (2023.01); *G06T 5/20* (2013.01); *G06T 7/0002* (2013.01); *G06T 7/13* (2017.01);
(Continued)

(58) Field of Classification Search
CPC . G06T 2207/10024; G06T 2207/30168; G06T 5/20; G06T 7/0002; G06T 7/13; G06T 7/90; H04N 23/843
See application file for complete search history.

(56) References Cited

U.S. PATENT DOCUMENTS

| 5,629,734 A | 5/1997 | Hamilton, Jr. et al. |
| 7,379,098 B2 | 5/2008 | Yamamoto et al. |
| | (Continued) | |

FOREIGN PATENT DOCUMENTS

JP    6415094 B2    10/2018

OTHER PUBLICATIONS

Eric Dubois, "Frequency-domain methods for Demosaicking of Bayer-sampled color images," IEEE Signal Processing Letters, vol. 12, No. 12, Published Dec. 2005.

(Continued)

*Primary Examiner* — Antoinette T Spinks
(74) *Attorney, Agent, or Firm* — Harness, Dickey & Pierce, P.L.C.

(57) ABSTRACT

An image processing method of an image signal processor includes obtaining a first estimated image by interpolating signals output from first color pixels, among a plurality of unit pixels included in a pixel array, in a first direction, obtaining a second estimated image by interpolating signals output from the first color pixels in a second direction, intersecting the first direction, detecting a first artifact component in the first direction with respect to pixels included in the first estimated image, detecting a second artifact component in the second direction with respect to pixels included in the second estimated image, obtaining a first weight based on at least a portion of the first artifact component and the second artifact component, and gener- (Continued)

ating a first output image from the first estimated image and the second estimated image using the first weight.

20 Claims, 18 Drawing Sheets

(51) Int. Cl.
G06T 7/00 (2017.01)
G06T 7/13 (2017.01)
G06T 7/90 (2017.01)

(52) U.S. Cl.
CPC ...... *G06T 7/90* (2017.01); *G06T 2207/10024* (2013.01); *G06T 2207/30168* (2013.01)

(56) References Cited

U.S. PATENT DOCUMENTS

| | | | |
|---|---|---|---|
| 7,605,848 B2 | 10/2009 | Lee et al. | |
| 8,638,342 B2 | 1/2014 | Cote et al. | |
| 9,350,185 B2 | 5/2016 | Longdon et al. | |
| 9,990,695 B2 | 6/2018 | Nishimura | |
| 10,984,504 B2 | 4/2021 | Oh et al. | |
| 11,263,724 B2 | 3/2022 | Gal | |
| 11,481,873 B2 | 10/2022 | Zavalishin et al. | |
| 12,299,856 B1* | 5/2025 | Kanwar | G06T 5/70 |
| 2010/0021085 A1* | 1/2010 | Kabasawa | G06T 3/4084 |
| | | | 382/300 |
| 2018/0018759 A1* | 1/2018 | Granot | G06T 5/77 |
| 2025/0216045 A1* | 7/2025 | Wilhelm | F21S 41/27 |

OTHER PUBLICATIONS

Bahadir K. Gunturk, et al. "Demosaicking: Color filter array interpolation," IEEE Signal Processing Magazine, vol. 22, No. 1, pp. 44-43, Published Jan. 2005.

Keigo Hirakawa, et al., "Adaptive homogeneity-directed demosaicing algorithm," Electrical and Computer Engineering Cornell University, IEEE International Conference on Image Processing, vol. 3, pp. 699-672, Published 2003.

Kuo-Liang Chung, et al., "Demosaicing of Color Filter Array Captured Images Using Gradient Edge Detection Masks and Adaptive Heterogeneity-Projection," IEEE Transactions on Image Processing, vol. 17, Issue 12, pp. 2356-2367, Published Dec. 2008.

* cited by examiner

FIG. 7A

| $G_{i-3, j-3}$ | $G_{i-3, j-2}$ | $G'_{i-3, j-1}$ | $G'_{i-3, j}$ | $G_{i-3, j+1}$ | $G_{i-3, j+2}$ | $G'_{i-3, j+3}$ | $G'_{i-3, j+4}$ |
|---|---|---|---|---|---|---|---|
| $G_{i-2, j-3}$ | $G_{i-2, j-2}$ | $G'_{i-2, j-1}$ | $G'_{i-2, j}$ | $G_{i-2, j+1}$ | $G_{i-2, j+2}$ | $G'_{i-2, j+3}$ | $G'_{i-2, j+3}$ |
| $G'_{i-1, j-3}$ | $G'_{i-1, j-2}$ | $G_{i-1, j-1}$ | $G_{i-1, j}$ | $G'_{i-1, j+1}$ | $G'_{i-1, j+2}$ | $G_{i-1, j+3}$ | $G_{i-1, j+4}$ |
| $G'_{i, j-3}$ | $G'_{i, j-2}$ | $G_{i, j-1}$ | $G_{i, j}$ | $G'_{i, j+1}$ | $G'_{i, j+2}$ | $G_{i, j+3}$ | $G_{i, j+4}$ |
| $G_{i+1, j-3}$ | $G_{i+1, j-2}$ | $G'_{i+1, j-1}$ | $G'_{i+1, j}$ | $G_{i+1, j+1}$ | $G_{i+1, j+2}$ | $G'_{i+1, j+3}$ | $G'_{i+1, j+4}$ |
| $G_{i+2, j-3}$ | $G_{i+2, j-2}$ | $G'_{i+2, j-1}$ | $G'_{i+2, j}$ | $G_{i+2, j+1}$ | $G_{i+2, j+2}$ | $G'_{i+2, j+3}$ | $G'_{i+2, j+4}$ |
| $G'_{i+3, j-3}$ | $G'_{i+3, j-2}$ | $G_{i+3, j-1}$ | $G_{i+3, j}$ | $G'_{i+3, j+1}$ | $G'_{i+3, j+2}$ | $G_{i+3, j+3}$ | $G_{i+3, j+4}$ |
| $G'_{i+4, j-3}$ | $G'_{i+4, j-2}$ | $G_{i+4, j-1}$ | $G_{i+4, j}$ | $G'_{i+4, j+1}$ | $G'_{i+4, j+2}$ | $G_{i+4, j+3}$ | $G_{i+4, j+4}$ |

FIG. 7B

| | | | | | | | |
|---|---|---|---|---|---|---|---|
| $G_{i-3, j-3}$ | $G_{i-3, j-2}$ | $G''_{i-3, j-1}$ | $G''_{i-3, j}$ | $G_{i-3, j+1}$ | $G_{i-3, j+2}$ | $G''_{i-3, j+3}$ | $G''_{i-3, j+4}$ |
| $G_{i-2, j-3}$ | $G_{i-2, j-2}$ | $G''_{i-2, j-1}$ | $G''_{i-2, j}$ | $G_{i-2, j+1}$ | $G_{i-2, j+2}$ | $G''_{i-2, j+3}$ | $G''_{i-2, j+3}$ |
| $G''_{i-1, j-3}$ | $G''_{i-1, j-2}$ | $G_{i-1, j-1}$ | $G_{i-1, j}$ | $G''_{i-1, j+1}$ | $G''_{i-1, j+2}$ | $G_{i-1, j+3}$ | $G_{i-1, j+4}$ |
| $G''_{i, j-3}$ | $G''_{i, j-2}$ | $G_{i, j-1}$ | $G_{i, j}$ | $G''_{i, j+1}$ | $G''_{i, j+2}$ | $G_{i, j+3}$ | $G_{i, j+4}$ |
| $G_{i+1, j-3}$ | $G_{i+1, j-2}$ | $G''_{i+1, j-1}$ | $G''_{i+1, j}$ | $G_{i+1, j+1}$ | $G_{i+1, j+2}$ | $G''_{i+1, j+3}$ | $G''_{i+1, j+4}$ |
| $G_{i+2, j-3}$ | $G_{i+2, j-2}$ | $G''_{i+2, j-1}$ | $G''_{i+2, j}$ | $G_{i+2, j+1}$ | $G_{i+2, j+2}$ | $G''_{i+2, j+3}$ | $G''_{i+2, j+4}$ |
| $G''_{i+3, j-3}$ | $G''_{i+3, j-2}$ | $G_{i+3, j-1}$ | $G_{i+3, j}$ | $G''_{i+3, j+1}$ | $G''_{i+3, j+2}$ | $G_{i+3, j+3}$ | $G_{i+3, j+4}$ |
| $G''_{i+4, j-3}$ | $G''_{i+4, j-2}$ | $G_{i+4, j-1}$ | $G_{i+4, j}$ | $G''_{i+4, j+1}$ | $G''_{i+4, j+2}$ | $G_{i+4, j+3}$ | $G_{i+4, j+4}$ |

| $R_{i-3,j-3}$ | $R_{i-3,j-2}$ | $R_{i-3,j-1}$ | $R_{i-3,j}$ | $R_{i-3,j+1}$ | $R_{i-3,j+2}$ | $R_{i-3,j+3}$ | $R_{i-3,j+4}$ |
|---|---|---|---|---|---|---|---|
| $R_{i-2,j-3}$ | $R_{i-2,j-2}$ | $R_{i-2,j-1}$ | $R_{i-2,j}$ | $R_{i-2,j+1}$ | $R_{i-2,j+2}$ | $R_{i-2,j+3}$ | $R_{i-2,j+3}$ |
| $R_{i-1,j-3}$ | $R_{i-1,j-2}$ | $R_{i-1,j-1}$ | $R_{i-1,j}$ | $R_{i-1,j+1}$ | $R_{i-1,j+2}$ | $R_{i-1,j+3}$ | $R_{i-1,j+4}$ |
| $R_{i,j-3}$ | $R_{i,j-2}$ | $R_{i,j-1}$ | $R_{i,j}$ | $R_{i,j+1}$ | $R_{i,j+2}$ | $R_{i,j+3}$ | $R_{i,j+4}$ |
| $R_{i+1,j-3}$ | $R_{i+1,j-2}$ | $R_{i+1,j-1}$ | $R_{i+1,j}$ | $R_{i+1,j+1}$ | $R_{i+1,j+2}$ | $R_{i+1,j+3}$ | $R_{i+1,j+4}$ |
| $R_{i+2,j-3}$ | $R_{i+2,j-2}$ | $R_{i+2,j-1}$ | $R_{i+2,j}$ | $R_{i+2,j+1}$ | $R_{i+2,j+2}$ | $R_{i+2,j+3}$ | $R_{i+2,j+4}$ |
| $R_{i+3,j-3}$ | $R_{i+3,j-2}$ | $R_{i+3,j-1}$ | $R_{i+3,j}$ | $R_{i+3,j+1}$ | $R_{i+3,j+2}$ | $R_{i+3,j+3}$ | $R_{i+3,j+4}$ |
| $R_{i+4,j-3}$ | $R_{i+4,j-2}$ | $R_{i+4,j-1}$ | $R_{i+4,j}$ | $R_{i+4,j+1}$ | $R_{i+4,j+2}$ | $R_{i+4,j+3}$ | $R_{i+4,j+4}$ |

FIG. 14B

| | | | | | | |
|---|---|---|---|---|---|---|
| | $R_{i-3, j-2}$ | | $R_{i-3, j}$ | | $R_{i-3, j+2}$ | | $R_{i-3, j+4}$ |
| | | | | | | |
| | $R_{i-1, j-2}$ | | $R_{i-1, j}$ | | $R_{i-1, j+2}$ | | $R_{i-1, j+4}$ |
| | | | | | | |
| | $R_{i+1, j-2}$ | | $R_{i+1, j}$ | | $R_{i+1, j+2}$ | | $R_{i+1, j+4}$ |
| | | | | | | |
| | $R_{i+3, j-2}$ | | $R_{i+3, j}$ | | $R_{i+3, j+2}$ | | $R_{i+3, j+4}$ |
| | | | | | | | ns
IMAGE SIGNAL PROCESSOR SUPPORTING IMAGE INTERPOLATION AND IMAGE PROCESSING METHOD USING THE SAME

CROSS-REFERENCE TO RELATED APPLICATION(S)

This application claims benefit of priority to Korean Patent Application No. 10-2023-0067281, filed on May 24, 2023 and 10-2023-0109357, filed on Aug. 21, 2023, in the Korean Intellectual Property Office, the disclosures of each of which are incorporated herein by reference in their entirety.

BACKGROUND

The present inventive concepts relate, in general, to image signal processors.

An image sensor includes a plurality of unit pixels outputting a light signal corresponding to an object as an electrical signal. Each of the unit pixels, included in a color filter array of the image sensor, detects a single color value among a red (R) color value, a green (G) color value, and a blue (B) color value. The R, G, or B color value, detected by each unit pixel, is converted into a digital signal by an analog-to-digital converter (ADC) included in the image sensor and the digital signal is input to an image signal processor (hereinafter referred to as an "ISP").

An actual color of an object may be represented by combining R, G, and B. Since data detected by each unit pixel of the image sensor contains information on only one of R, G, and B, an ISP performs color interpolation using R, G, and B data detected by the unit pixels such that a single unit pixel contains all R, G, and B information.

However, a direction for each pixel and a value based on the direction should be calculated from a central location to perform interpolation. As a result, an amount of calculation may be increased and accuracy of the calculation may be decreased.

SUMMARY

Example embodiments provide an image signal processor which may restore input image data using a simple operation including interpolation in a specified direction.

According to some example embodiments, an image processing method of an image signal processor includes obtaining a first estimated image by interpolating signals output from first color pixels, among a plurality of unit pixels included in a pixel array, in a first direction, obtaining a second estimated image by interpolating signals output from the first color pixels in a second direction, intersecting the first direction, detecting a first artifact component in the first direction with respect to pixels included in the first estimated image, detecting a second artifact component in the second direction with respect to pixels included in the second estimated image, obtaining a first weight based on at least a portion of the first artifact component and the second artifact component, and generating a first output image from the first estimated image and the second estimated image using the first weight.

According to some example embodiments, an image signal processor includes processing circuitry configured to interpolate signals output from first color pixels, among a plurality of unit pixels included in a pixel array, in a first direction to obtain a first estimated image and to interpolate the signals in a second direction, intersecting the first direction, to obtain a second estimated image, detect a first artifact component in the first direction with respect to pixels included in the first estimated image and to detect a second artifact component in the second direction with respect to pixels included in the second estimated image, obtain a first weight using the first artifact component and the second artifact component, and generate a first output image from the first estimated image and the second estimated image using the first weight.

According to some example embodiments, an image processing device comprising an image signal processor includes processing circuitry configured to interpolate signals output from first color pixels, among a plurality of unit pixels included in a pixel array, in a first direction to obtain a first estimated image and to interpolate the signals in a second direction, intersecting the first direction, to obtain a second estimated image, detect a first artifact component of the first estimated image in the first direction and to detect a second artifact component of the second estimated image in the second direction, obtain a first weight using the first artifact component and the second artifact component, and generate a first output image from the first estimated image and the second estimated image using the first weight.

BRIEF DESCRIPTION OF DRAWINGS

The above and other aspects, features, and advantages of the present inventive concepts will be more clearly understood from the following detailed description, taken in conjunction with the accompanying drawings.

FIG. 7A is a diagram illustrating a configuration in which the image signal processor of FIG. 6 generates a first artifact value based on a first artifact component according to some example embodiments.

FIG. 7B illustrates a configuration in which the image signal processor of FIG. 6 generates a second artifact value based on a second artifact component according to some example embodiments.

FIG. 14A is a diagram illustrating an example of a second output image estimated from a first output image by an image signal processor according to some example embodiments.

FIG. 14B is a diagram illustrating another example of a second output image estimated from a first output image by an image signal processor according to some example embodiments.

DETAILED DESCRIPTION

Figure 1:
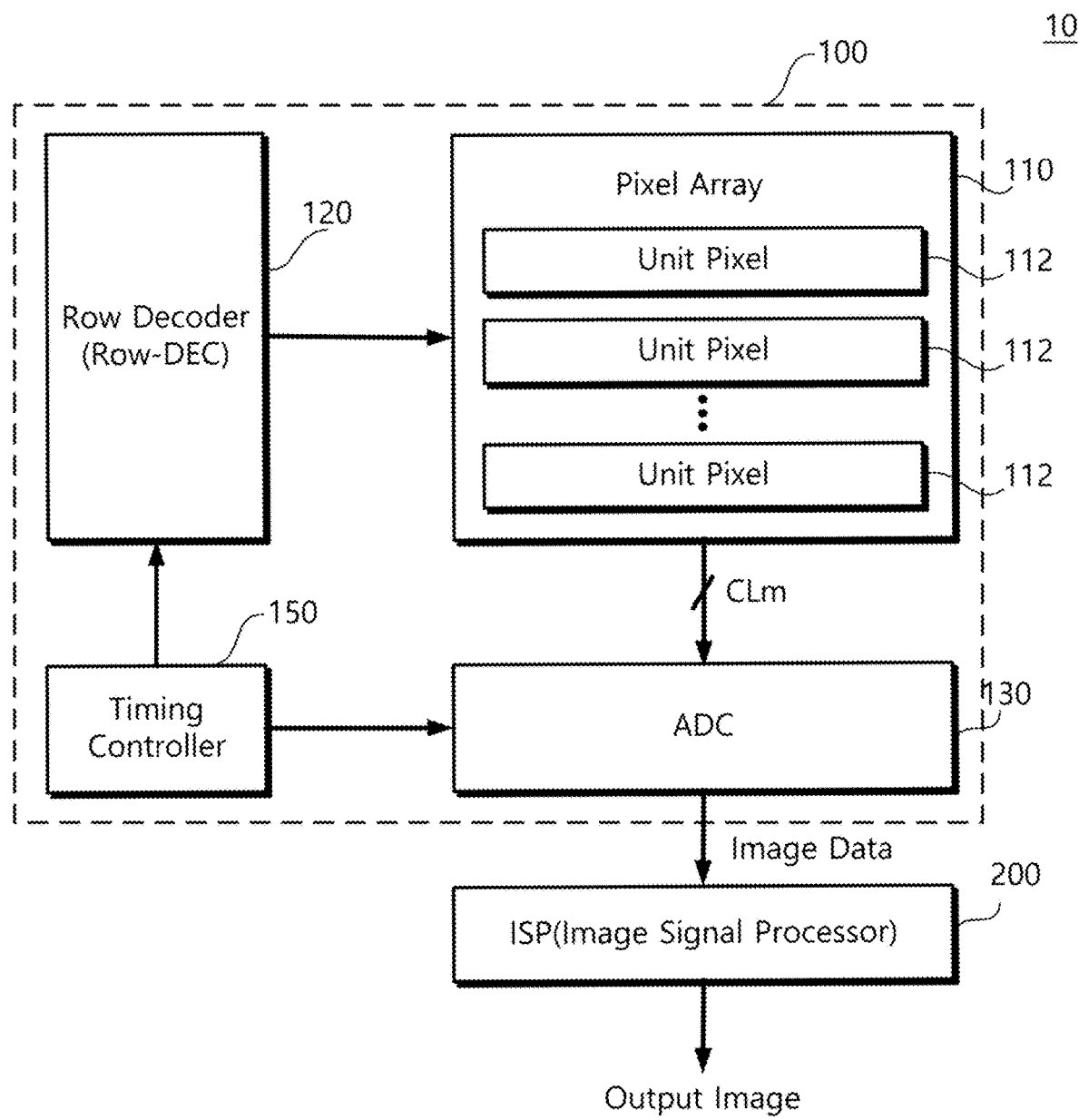
FIG. 1 is a block diagram of an image processing device according to some example embodiments.

Hereinafter, some example embodiments of the inventive concepts will be described with reference to the accompanying drawings, in which some example embodiments are shown. As those skilled in the art would realize, the described example embodiments may be modified in various different ways, all without departing from the spirit or scope of the inventive concepts.

Accordingly, the drawings and description are to be regarded as illustrative in nature and not restrictive. Like reference numerals designate like elements, the sequence of operations or steps are not limited to the order presented in the claims or figures unless specifically indicated otherwise. The order of operations or steps may be changed, several operations or steps may be merged, some operations or steps may be divided, and specific operations or steps may not be performed.

In addition, as used herein, expression written in the singular may be construed in the singular or plural unless an explicit expression such as "one" or "single" is used. The singular forms "a" and "an" are intended to include the plural form as well, unless the context clearly indicates otherwise. Although the terms including ordinal number such as first, second, and the like may be used herein to describe various elements, components, steps and/or operations, these terms are only used to distinguish one element, component, step or operation from another element component, step, or operation, and are not to be interpreted as limiting these components.

FIG. 1 is a block diagram illustrating an image processing device according to some example embodiments.

Referring to FIG. 1, an image processing device 10 may include an image sensor 100 and an image signal processor (ISP) 200. The image sensor 100 and the image signal processor 200 may be integrated into a single chip or implemented as separate chips.

The image sensor 100 may include a pixel array 110, a row decoder (Row-DEC) 120, an analog-to-digital converter (ADC) 130, and a timing controller 150.

The pixel array 110 may generate a plurality of pixel signals (for example, analog pixel signals) based on incident light.

In some example embodiments, the pixel array 110 may include a plurality of unit pixels 112. The plurality of unit pixels 112 may be arranged in a matrix of, for example, a plurality of rows and a plurality of columns.

The unit pixels 112 may have a pattern appropriate to sense a color image. For example, the unit pixels 112 may be monochrome pixels detecting a range of visible wavelengths, and each of the unit pixels 112 may be coupled to a single pixel, among an R filter, a G filter, and a B filter, but example embodiments are not limited thereto. In some example embodiments, the unit pixels 112 may be understood as pixels detecting a range of near infrared radiation (NIR) wavelengths. However, the range of wavelengths, which may be detected by the unit pixels 112, are not limited to the above-described example embodiments.

In some example embodiments, a unit pixel 112 coupled to the G filter may be referred to as a G pixel. A unit pixel 112 coupled to the R filter may be referred to as an R pixel. A unit pixel 112 coupled to the B filter may be referred to as a B pixel.

For example, a signal, output from a unit pixel 112 coupled to the G filter, may be referred to as a G color value. A signal, output from a unit pixel 112 coupled to the R filter, may be referred to as an R color value. A signal, output from a unit pixel 112 coupled to the B filter, may be referred to as a B color value.

In some example embodiments, complementary metal-oxide semiconductor (CMOS) image sensors and charge-coupled device (CCD) image sensors have R, G and B filters in a predetermined arrangement pattern. For example, the R, G and B filters may be arranged in a Bayer pattern. In some example embodiments, the image sensor 100 may provide RGB Bayer image data in which one of the R, G, and B color values is matched for each unit pixel 112.

In some example embodiments, the R, G, and B filters may be arranged in a quad-Bayer pattern. For example, the image sensor 100 may provide tetra color filter array (CFA) image data in which one of the R, G, and B color values is matched for each of four pixels, arranged in a 2-by-2 array, to constitute a 4-by-4 Bayer pattern.

However, the arrangement of the unit pixels 112 included in the pixel array 110 is not limited to the above-described example embodiments, and may be referenced as, for example, a single pattern, among an RGBE pattern, an RGBW pattern, and an RGB-IR pattern. Below, the unit pixels 112 according to some example embodiments will be described as being arranged to have a quad-Bayer pattern.

In some example embodiments, electrical signals generated by the unit pixels 112 may be provided to the analog-to-digital converter (ADC) 130 through a plurality of column lines CLm, respectively.

The row decoder (Row-DEC) 120 may select a single row of the pixel array 110 under the control of the timing controller 150. For example, the row decoder (Row-DEC) 120 may drive the plurality of unit pixels 112, included in the pixel array 110, in units of rows.

In some example embodiments, a reset level signal, a sensing signal, or the like, generated from each of the unit pixels 112 of the pixel array 110 may be transmitted to the analog-to-digital converter (ADC) 130.

The analog-to-digital converter (ADC) 130 may be connected to each column of the pixel array 110 and may convert an analog signal, output from the pixel array 110, into a digital signal. In some example embodiments, the analog-to-digital converter (ADC) 130 may include a plurality of analog-to-digital converters and may convert analog signals, output for each column line (e.g., for each column line of the plurality of column lines CLm), into digital signals in parallel, but example embodiments are not limited thereto. In some example embodiments, the analog-to-digital converter (ADC) 130 may include a single analog-to-digital converter and may sequentially convert analog signals into digital signals.

The timing controller 150 may control at least a portion of the pixel array 110, the row decoder (Row-DEC) 120, and the analog-to-digital converter (ADC) 130. The timing controller 150 may provide control signals, for example a clock signal and a timing control signal, to operations of the pixel array 110, the row decoder 120, and the analog-to-digital converter (ADC) 130. The timing controller 150 may include at least one of a logic control circuit, a phase lock loop (PLL) circuit, a timing control circuit, and a communication interface circuit, but example embodiments are not limited thereto.

The image signal processor 200 may receive image data provided from the image sensor 100, and may process the received image data. For example, the image signal processor 200 may perform image interpolation, color correction, white balance, gamma correction, color conversion, or the like.

The image signal processor 200 according to some example embodiments may restore input image data through an operation including an interpolation operation in a specified direction.

For example, the image signal processor 200 may perform interpolation on the input image data in a predetermined direction to obtain a plurality of estimated images based on interpolation in each direction. In some example embodiments, the image signal processor 200 may detect artifacts for a specified direction from estimated images. In some example embodiments, the image signal processor 200 may obtain a weight for each of the estimated images using an artifact detected from the estimated images. Furthermore, in some example embodiments, the image signal processor 200 may apply the obtained weights to the estimated images to generate an output image as a result of restoring input image data.

In some example embodiments, the artifact may be referenced as a side effect occurring during interpolation, correction, or conversion of image data. For example, the artifact may be referenced as one of a zipper effect, false color, aliasing, or blurring occurring during an interpolation process on image data, but example embodiments are not limited thereto.

In some example embodiments, the image signal processor 200 may omit an operation of calculating a direction for each pixel from a central location and may perform interpolation on image data. For example, the image signal processor 200 may perform interpolation in a specified direction without calculation for a direction from the central location to each pixel.

Through such a configuration, the image signal processor 200 according to some example embodiments may simplify an operation of restoring image data.

Accordingly, the image signal processor 200 may significantly reduce power consumed to restore the image data. In some example embodiments, the image signal processor 200 may significantly reduce errors during an operation of restoring the image data to improve accuracy of the operation.

The configuration of the image processing device 10 according to some example embodiments has been described in brief. Hereinafter, a more detailed configuration of the image signal processor 200 for restoring image data according to some example embodiments will be described.

Figure 2:
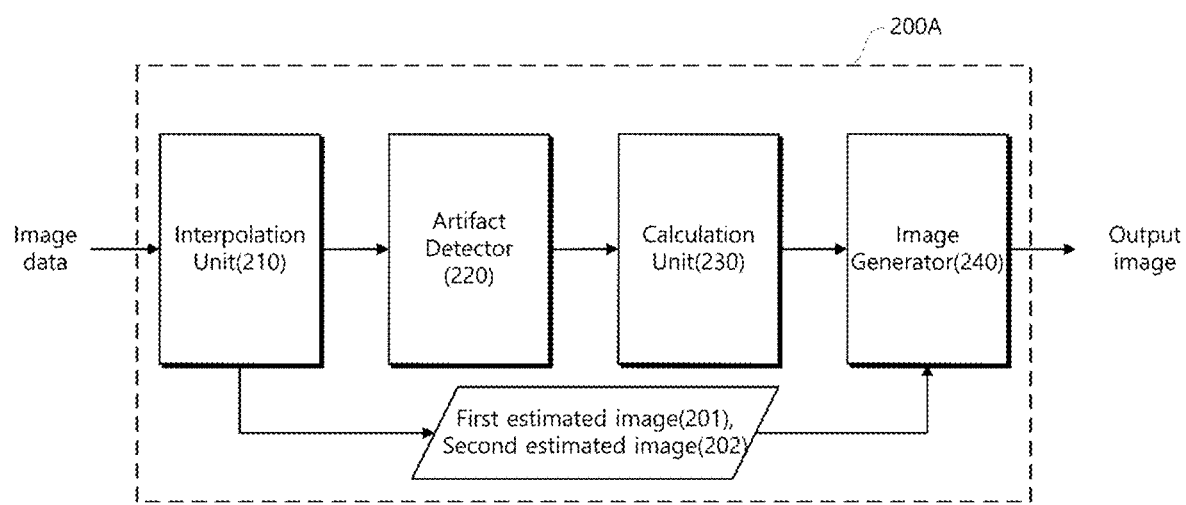
FIG. 2 is a block diagram illustrating an example of the image signal processor of FIG. 1 according to some example embodiments.

FIG. 2 is a block diagram illustrating an example of the image signal processor of FIG. 1 according to some example embodiments.

Referring to FIG. 2, an image signal processor 200A according to some example embodiments may restore a color value for each unit pixel 112 of image data to generate an output image. For example, the image signal processor 200A may be understood as an example of the image signal processor 200 of FIG. 1.

According to some example embodiments, the image signal processor 200A may include an interpolation unit 210, an artifact detector 220, a calculation unit 230, and an image generator 240. In some example embodiments, at least part of the interpolation unit 210, the artifact detector 220, the calculation unit 230, and the image generator 240 may include or be implemented as respective processing circuitry such as hardware (e.g., logic circuits) or a combination of hardware and software (e.g., a computer-based electronic system) like a processor executing instruction codes or program routines (e.g., a software program). The instruction codes or the program routines may be stored in any storage device located inside or outside the computer-based electronic system.

The interpolation unit 210 may receive image data. In some example embodiments, the input image data may be understood as image data mosaicked based on a pattern of a color filter array CFA. For example, the input image data may be understood as image data mosaicked based on a quad-Bayer pattern.

The interpolation unit 210 may perform interpolation on the input image data in a predetermined first direction. For example, the interpolation unit 210 may perform interpolation on the image data in the predetermined first direction using signals output from a first color pixel (for example, a G pixel), among the plurality of unit pixels 112. For example, the interpolation unit 210 may generate a first estimated image 201 including unit pixels having a first color value (for example, a G color value).

In some example embodiments, the interpolation unit 210 may perform interpolation in a second direction, intersecting the first direction, using signals output from first color pixels (for example, G pixels), among the plurality of unit pixels 112. For example, the interpolation unit 210 may generate a second estimated image 202 including unit pixels having a first color value (for example, a G color value).

For example, the interpolation unit 210 may estimate a G color value at a point, at which an R pixel and a B pixel are disposed, based on signals output from G pixels among the unit pixels 112.

Accordingly, in some example embodiments, the first estimated image 201 and the second estimated image 202 may include first color values at points corresponding to the second color pixel and the third color pixel, among the unit pixels 112. For example, the first estimated image 201 and the second estimated image 202 may include a G color value estimated for points corresponding to an R pixel and a B pixel, among the unit pixels 112.

The artifact detector 220 may receive the first estimated image 201 and the second estimated image 202 from the interpolation unit 210.

The artifact detector 220 may detect a first artifact component from the first estimated image 201 in a first direction. In some example embodiments, the artifact detector 220 may detect a second artifact component from the second estimated image 202 in a second direction.

For example, the artifact detector 220 may apply a predetermined filter to a plurality of pixels, arranged in one direction, in the estimated images 201 and 202. Accordingly, in some example embodiments, the artifact detector 220 may detect an artifact component for a specified direction from the estimated images 201 and 202.

For example, the artifact detector 220 may apply a predetermined filter to a plurality of pixels, arranged in the second direction, in the first estimated image 201. Furthermore, the artifact detector 220 may sequentially apply the above-mentioned filter to the plurality of pixels while moving on the first estimated image 201 in the first direction. Accordingly, in some example embodiments, the artifact detector 220 may detect the first artifact component in the first direction.

In some example embodiments, the artifact detector 220 may apply a predetermined filter to the plurality of pixels, arranged in the first direction, in the second estimated image 202. In some example embodiments, the artifact detector 220 may sequentially apply the above-mentioned filter to the plurality of pixels while moving on the second estimated image 202 in the second direction. Accordingly, in some example embodiments, the artifact detector 220 may detect the second artifact component in the second direction.

In some example embodiments, the first artifact component and the second artifact component may be referenced as data generated by applying a predetermined filter value to data of the plurality of pixels. Accordingly, in some example embodiments, the image signal processor 200A may detect a point, at which an artifact is generated for each direction in the estimated images 201 and 202 based on an amount of change in the first artifact component or the second artifact component.

In some example embodiments, the artifact detector 220 may detect an artifact component at a point at which data of the pixels included in the estimated images 201 and 202 change by more than a predetermined standard. In some example embodiments, a point at which data of pixels included in the estimated images 201 and 202 is changed to be greater than or equal to a predetermined criterion may be referred to as an edge or an edge region. In some example embodiments, the artifact detector 220 may be referred to as an edge detector.

In some example embodiments, the filter applied to the estimated images 201 and 202 by the artifact detector 220 may be referenced as a Laplacian operator. However, example embodiments in which the artifact detector 220 detects the artifact component are not limited solely to the above-described example embodiments. For example, the above-mentioned filter may be referenced as one of a Sobel mask, a Prewitt mask, or a canny edge.

According to some example embodiments, the artifact detector 220 may be implemented as a 1D or 2D finite impulse response (FIR) filter.

In some example embodiments, the calculation unit 230 may obtain a first weight using the first artifact component and the second artifact component.

The calculation unit 230 may generate a first artifact value from a first artifact component. In some example embodiments, the calculation unit 230 may generate a second artifact value from the second artifact component.

For example, the calculation unit 230 may generate a first artifact value by raising at least a portion of the first artifact components of the first estimated image 201 to a power. For example, the calculator 230 may generate a second artifact value by raising at least a portion of the second artifact components of the second estimated image 201 to a power.

Furthermore, in some example embodiments, the calculation unit 230 may obtain a first weight from the first artifact value and the second artifact value using a predetermined equation. For example, the calculation unit 230 may obtain a ratio of the second artifact value to a sum of the first artifact value and the second artifact value, as the first weight.

In some example embodiments, the calculator 230 may obtain a value, obtained by subtracting the first weight from a specified value (for example, "1"), as a second weight. For example, the calculation unit 230 may obtain a ratio of the first artifact value to a sum of the first artifact value and the second artifact value, as the second weight.

In some example embodiments, the image generator 240 may obtain the first estimated image 201 and the second estimated image 202 from the interpolation unit 210. In some example embodiments, the image generator 240 may obtain the first weight and the second weight from the calculation unit 230.

The image generator 240 according to some example embodiments may generate a first output image from the first estimated image 201 and the second estimated image 202 using the first weight.

For example, the image generator 240 may generate a first output image by combining the first estimated image 201, to which the first weight is applied, and the second estimated image 202 to which the second weight is applied.

For example, the image generator 240 may sum a value, obtained by applying the first weight to the first color value (for example, the G color value) of a single pixel included in the first estimated image 201, and a value obtained by applying the second weight to the first color value of a single pixel included in the second estimated image 202.

Accordingly, in some example embodiments, the image generator 240 may generate a first output image including unit pixels having a specific color value (for example, a G color value).

In some example embodiments, the first output image may be referenced as an image including first color values estimated for each unit pixel of the input image data. For example, the first output image may be referenced as image data generated by de-mosaicking a first color value of the image data mosaicked based on a specific pattern.

As described above, the image signal processor 200A according to some example embodiments may generate a first output image restored through an operation including interpolation on a specific color pixel (for example, a G pixel) of input image data in a predetermined direction.

Thus, the image signal processor 200A according to some example embodiments may reduce errors during an operation of restoring image data. As a result, the image signal processor 200A may save power consumed in the operation of restoring image data.

Figure 3:
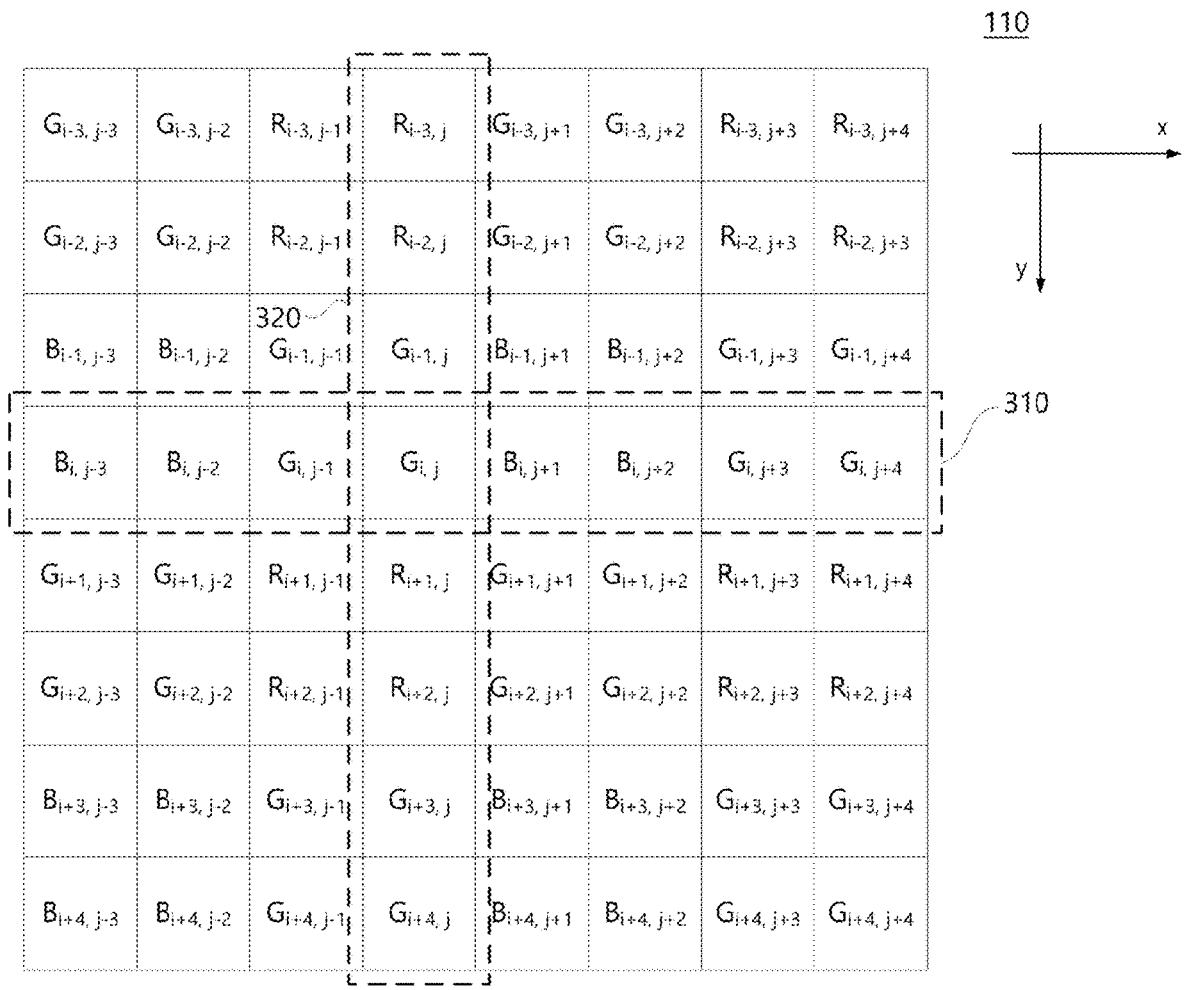
FIG. 3 is a diagram illustrating an example of a pixel array of FIG. 1 according to some example embodiments.
Figure 4A:
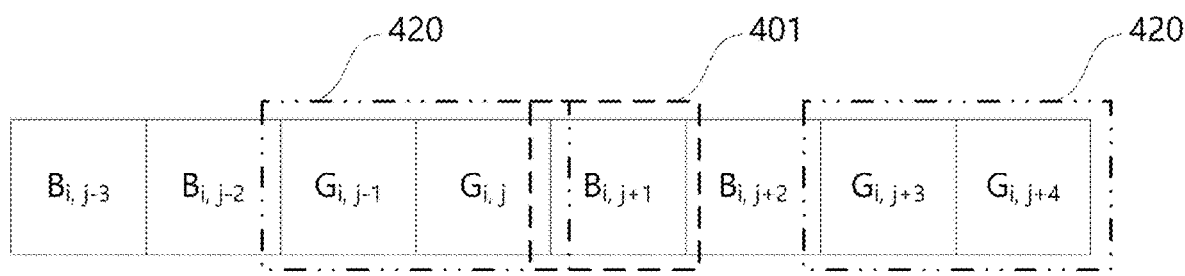
FIG. 4A is a diagram illustrating a configuration of performing interpolation on the pixel array of FIG. 3 in a first direction according to some example embodiments.

FIG. 3 is a diagram illustrating an example of a pixel array of FIG. 1 according to some example embodiments. FIG. 4A is a diagram illustrating a configuration of performing interpolation on the pixel array of FIG. 3 in a first direction according to some example embodiments, and FIG. 4B is a diagram illustrating a configuration of performing interpolation on the pixel array of FIG. 3 in a second direction according to some example embodiments.

Figure 4B:
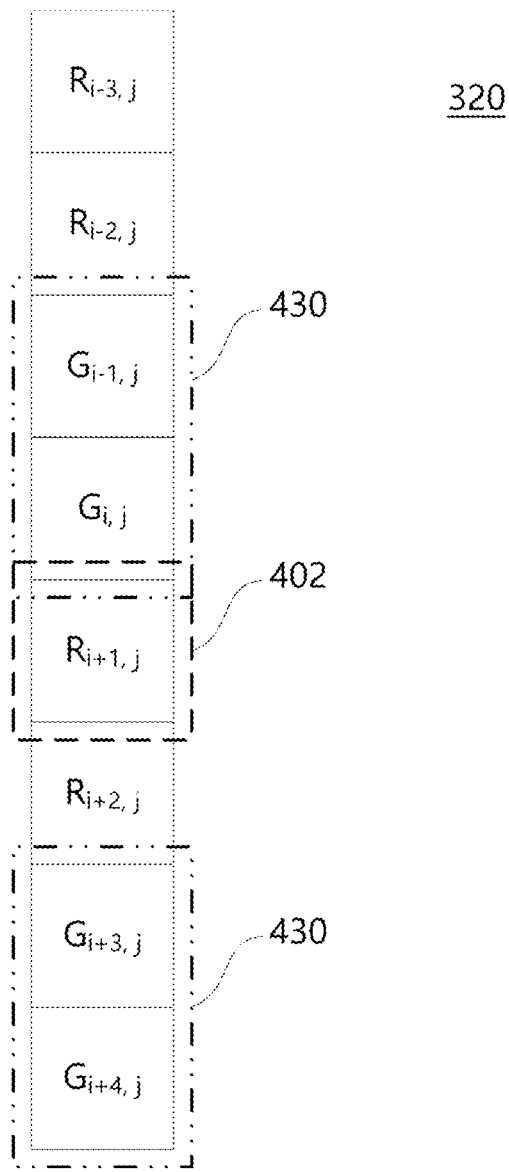
FIG. 4B is a diagram illustrating a configuration of performing interpolation on the pixel array of FIG. 3 in a second direction according to some example embodiments.

Referring to FIGS. 3, 4A, and 4B together, the image signal processor 200A (or the interpolation unit 210) according to some example embodiments may perform interpolation on the unit pixels 112, included in the pixel array 110, in a predetermined direction. For example, the image signal processor 200A may interpolate signals output from the first color pixels, among the unit pixels 112, in a predetermined direction to generate estimated images 201 and 202.

Referring to FIG. 3, the pixel array 110 according to some example embodiments may be understood to have a quad-Bayer pattern of an 8-by-8 array. For example, each color pixel of the pixel array 110 may be arranged in a 2-by-2 array. In some example embodiments, each color pixel arranged in the 2-by-2 array may constitute a Bayer pattern. For example, the pixel array 110 may constitute a Bayer pattern by alternating G pixels arranged in a 2-by-2 array, R pixels arranged in a 2-by-2 array, and B pixels arranged in a 2-by-2 array.

However, the arrangement of the unit pixels 112 included in the pixel array 110 according to some example embodiments are not limited to the above-described example embodiments.

Referring to FIGS. 3 and 4A together, the image signal processor 200A may identify a plurality of pixels 310, arranged in a first direction (for example, an x-direction), of the pixel array 110. In some example embodiments, the image signal processor 200A may identify a first pixel 401, among pixels excluding 1-1-th color pixels 420, from the plurality of pixels 310. For example, the image signal processor 200A may identify a pixel $B_{i,j+1}$, among pixels excluding 1-1-th color pixels 420 (for example, $G_{i,j-1}$, $G_{i,j}$, $G_{i,j+3}$, and $G_{i,j+4}$) each having a G color value from the plurality of pixels 310, as the first pixel 401.

The image signal processor 200A may estimate a first color value (for example, a G color value) of the first pixel 401 using the 1-1-th color pixels 420, among the plurality of pixels 310.

According to some example embodiments, the image signal processor 200A may estimate a first color value (for example, $G'_{I,j+1}$) of the first pixel 401 from the color values of the 1-1-th color pixels 420 using linear interpolation.

For example, the image signal processor 200A may estimate the first color value of the first pixel 401 based on a gradient between the color values of the 1-1-th color pixels 420.

For example, the image signal processor 200A may obtain a first G color value of the estimated first pixel 401 from the pixel $G_{i,j}$ based on a gradient between a color value of a pixel $G_{i,j-1}$ and a color value of the pixel $G_{i,j}$. In some example embodiments, the image signal processor 200A may obtain a second G color value of the estimated first pixel 401 from a pixel $G_{i,j+3}$ based on a gradient between a color values of the pixels $G_{i,j+3}$ and a color values of a pixel $G_{i,j+4}$. In some example embodiments, the image signal processor 200A may estimate the G color value $G'_{i,j+1}$ of the first pixel 401 through a weighted average for the first G color value and the second G color value.

Thus, the image signal processor 200A may obtain the first estimated image 201 including unit pixels having a specific color value (for example, the G color value). In some example embodiments, color values of the pixels constituting the first estimated image 201 are understood to be obtained through interpolation on image data in the first direction.

Referring to FIGS. 3 and 4B together, the image signal processor 200A may identify a plurality of pixels 320, arranged in a second direction (for example, a y-direction), of the pixel array 110. In some example embodiments, the image signal processor 200A may identify the second pixel 402, among pixels excluding the 1-2-th color pixels 430, from pixels included in the plurality of pixels 320. For example, the image signal processor 200A may identify a pixel $R_{i+1,j}$, among the plurality of pixels 320, as the second pixel 402.

The image signal processor 200A may estimate the first color value (for example, the G color value) of the second pixel 402 using the 1-2-th pixels 430, among pixels included in the plurality of pixels 320.

According to some example embodiments, the image signal processor 200A may estimate a first color value (for example, $G'_{i+1,j}$) of the second pixel 402 from color values of the 1-2-th color pixels 430 (for example, $G_{i-1,j}$, $G_{i,j}$, $G_{i+3,j}$, and $G_{i+4,j}$) using linear interpolation.

For example, the image signal processor 200A may estimate the first color value of the second pixel 402 based on a gradient between the color values of the first and second color pixels 430.

For example, the image signal processor 200A may obtain a third G color value of the estimated second pixel 402 from the pixel $G_{i,j}$ based on the gradient between the color value of the pixel $G_{i-1,j}$ and the color value of the pixel $G_{i,j}$. In some example embodiments, the image signal processor 200A may obtain a fourth G color value of the estimated second pixel 402 from a pixel $G_{i+3,j}$ based on a gradient between a color value of the pixel $G_{i+3,j}$ and a color value of a pixel $G_{i+4,j}$. In some example embodiments, the image signal processor 200A may estimate a G color value (for example, $G'_{i+1,j}$) of the second pixel 402 through a weighted average of the third G color value and the fourth G color value.

Thus, the image signal processor 200A may obtain a second estimated image 202 including unit pixels having a specific color value (for example, a G color value). In some example embodiments, color values of the unit pixels constituting the second estimated image 202 may be obtained through interpolation on the image data in the second direction.

However, the method of estimating the G color value of the first pixel 401 or the second pixel 402 by the image signal processor 200A according to some example embodiments is not limited to the above-described linear interpolation, and may be referenced as various methods of estimating the first color value of the first pixel 401 or the second pixel 402 using the first color pixels 420 and 430.

As described above, according to some example embodiments, the image signal processor 200A may perform interpolation on the plurality of unit pixels 112, included in the pixel array 110, in a predetermined direction. Thus, the image signal processor 200A may omit calculation for a direction from a center pixel to each pixel.

In some example embodiments, the image signal processor 200A may obtain estimated images 201 and 202 in which each unit pixel 112 of the pixel array 110 is implemented with a specific color value.

Accordingly, the image signal processor 200A according to some example embodiments may simplify an operation performed for interpolation. Also, the image signal processor 200A may significantly reduce power consumed to restore image data.

Figure 5A:
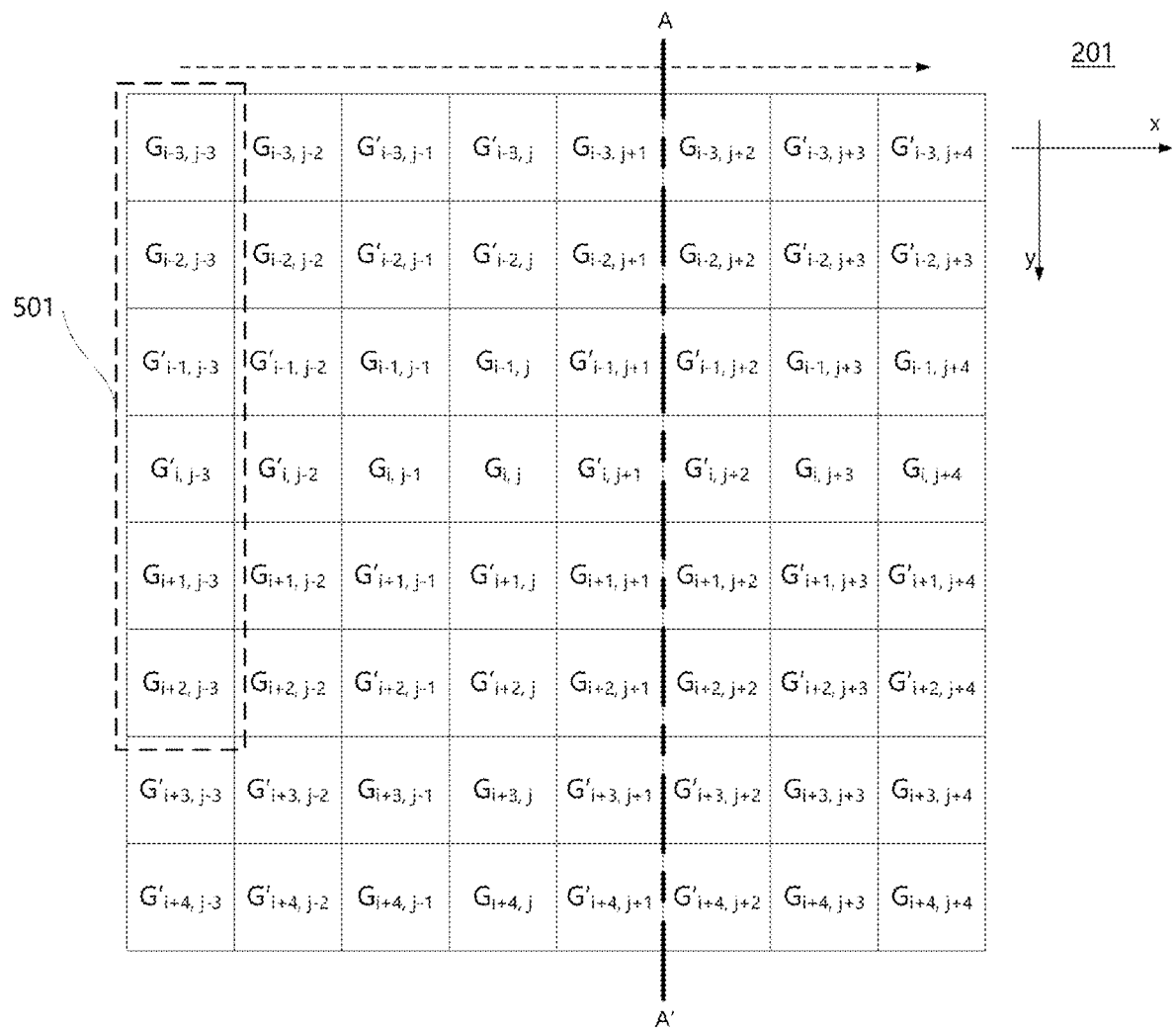
FIG. 5A is a diagram illustrating a configuration of detecting a first artifact component in a first estimated image, generated by FIG. 4A, in a first direction according to some example embodiments.
Figure 5B:
FIG. 5B is a diagram illustrating a configuration of detecting a second artifact component in a second estimated image, generated by FIG. 4B, in a second direction according to some example embodiments.

FIG. 5A is a diagram illustrating a configuration of detecting a first artifact component in a first estimated image, generated by FIG. 4A, in a first direction according to some example embodiments. FIG. 5B is a diagram illustrating a configuration of detecting a second artifact component in a second estimated image, generated by FIG. 4B, in a second direction according to some example embodiments.

Referring to FIGS. 5A and 5B together, an image signal processor 200A (or an artifact detector 220) according to some example embodiments may detect artifact components for a specific direction in estimated images 201 and 202.

For example, the image signal processor 200A may set a kernel including a plurality of pixels, arranged in a specific direction, of the estimated images 201 and 202. In some example embodiments, the image signal processor 200A may apply a predetermined filter to the set kernel. Thus, the image signal processor 200A may detect an artifact component for the specific direction.

For example, referring to FIG. 5A, the image signal processor 200A may set a first kernel 501 including a plurality of pixels, arranged in a second direction (for example, a y-direction), of the first estimated image 201. In some example embodiments, the image signal processor 200A may apply a predetermined filter to the first kernel 501. In some example embodiments, the filter may be understood as a matrix having an arrangement and a size corresponding to those of the first kernel 501.

In some example embodiments, the image signal processor 200A may sequentially apply the filter to the plurality of pixels, arranged in the second direction, while moving from the first kernel 501 in a first direction (for example, an x-direction) on the first estimated image 201. Thus, the image signal processor 200A may obtain first artifact components in the first direction.

An operation, according to some example embodiments, in which the image signal processor 200A obtains first artifact components $F_h$ in the first direction, will be represented by the following equation 1.

$$F_h = h_{e,h} * G_h \qquad \text{Equation 1}$$

In some example embodiments, $G_h$ may be referenced as first color values of pixels included in the first estimated image 201 obtained through interpolation in the first direction. In some example embodiments, $h_{e,h}$ may be referenced as an example of the above-mentioned filter. For example, $h_{e,h}$ may be referenced as a Laplacian operator in a horizontal direction, but example embodiments are not limited thereto.

For example, the first artifact components $F_h$ in the first direction may be obtained as a result of convolving of the first color values, obtained through the interpolation in the first direction, with the Laplacian operator in the horizontal direction.

In some example embodiments, the image signal processor 200A may identify a region (or an edge), in which an artifact (or an edge) is generated, of the first estimated image 201 based on the first artifact components in the first direction.

In some example embodiments, the image signal processor 200A may identify a region in which an artifact is generated, based on components, exceeding a predetermined reference value, among first artifact components in the first direction. In some example embodiments, the image signal processor 200A may identify a region, in which an artifact is generated, based on components, having a difference greater than or equal to a predetermined value from an average of the first artifact components, among the first artifact components in the first direction. However, the method of identifying the artifact from the first estimated image 201 based on the first artifact components by the image signal processor 200A is not limited to the above-described example embodiments.

Thus, the image signal processor 200A may identify that, for example, an artifact has been generated along line A-A' in the first estimated image 201.

Referring to FIG. 5B, the image signal processor 200A may set a second kernel 502, including a plurality of pixels arranged in a first direction (for example, an x-direction), of the second estimated image 202. In some example embodiments, the image signal processor 200A may apply a predetermined filter to the second kernel 502. In some example embodiments, the filter may be understood as a matrix having an arrangement and size corresponding to those of the second kernel 502.

In some example embodiments, the image signal processor 200A may sequentially apply the filter to the plurality of pixels arranged in the first direction while moving from the second kernel 502 in a second direction (for example, a y-direction) on the second estimated image 202. Thus, the image signal processor 200A may obtain second artifact components in the second direction.

An operation, according to some example embodiments, in which the image signal processor 200A obtains second artifact components $F_v$ in the second direction, will be represented by the following equation 2.

$$F_v = h_{e,v} * G_v \qquad \text{Equation 2}$$

In some example embodiments, $G_v$ may be referenced as first color values included in the second estimated image 202 obtained through interpolation in the second direction. In some example embodiments, $h_{e,v}$ may be referenced as an example of the above-mentioned filter. For example, $h_{e,v}$ may be referenced as a Laplacian operator in a vertical direction, but example embodiments are not limited thereto.

For example, the second artifact components $F_v$ in the second direction may be obtained as a result of convolving the first color values obtained through interpolation in the second direction with the Laplacian operator in the vertical direction.

In some example embodiments, the image signal processor 200A may identify a region, in which an artifact (or an edge) is generated, of the second estimated image 202 based on the second artifact components in the second direction.

For example, the image signal processor 200A may identify a region, in which an artifact is generated, based on components, exceeding a predetermined reference value, among the second artifact components in the second direction. In some example embodiments, the image signal processor 200A may identify a region, in which an artifact is generated, based on components, having a difference greater than or equal to a predetermined value from the average value of the second artifact components, among the second artifact components in the second direction. However, a method of identifying an artifact from the second estimated image 202 based on the second artifact components by the image signal processor 200A is not limited to the above-described example embodiments.

Thus, the image signal processor 200A may identify that, for example, an artifact has been generated along line B-B' in the second estimated image 202.

As described above, in some example embodiments, the image signal processor 200A may detect an artifact component for a predetermined direction in the estimated images 201 and 202. Thus, the image signal processor 200A according to some example embodiments may simplify an operation of detecting an artifact component.

Figure 6:
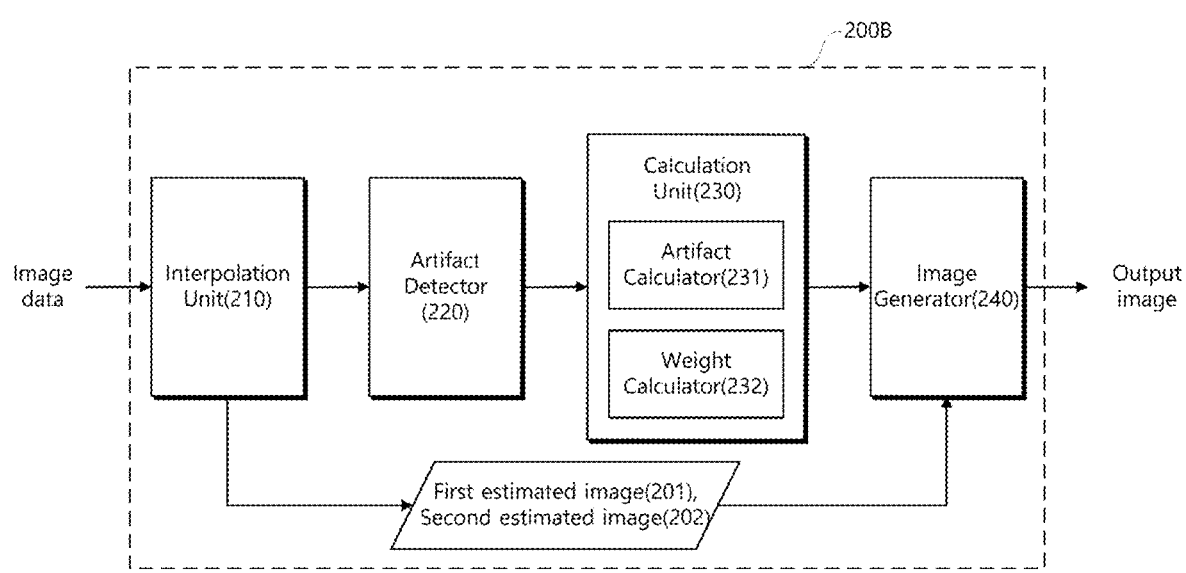
FIG. 6 is a block diagram illustrating an image signal processor according to some example embodiments.

FIG. 6 is a block diagram illustrating an image signal processor 200B according to some example embodiments. FIG. 7A is a diagram illustrating a configuration in which the image signal processor of FIG. 6 generates a first artifact value based on a first artifact component according to some example embodiments. FIG. 7B illustrates a configuration in which the image signal processor of FIG. 6 generates a second artifact value based on a second artifact component according to some example embodiments.

Referring to FIG. 6, the calculation unit 230 of the image signal processor 200B according to some example embodiments may further include an artifact calculator 231, generating artifact values from artifact components, and a weight calculator 232 generating weights based on the artifact values. According to some example embodiments, the artifact calculator 231 and the weight calculator 232 may be integrally formed. In some example embodiments, at least a part of the artifact calculator 231 and the weight calculator 232 may include or be implemented as respective processing circuitry such as hardware (e.g., logic circuits) or a combination of hardware and software (e.g., a computer-based electronic system) like a processor executing instruction codes or program routines (e.g., a software program). The instruction codes or the program routines may be stored in any storage device located inside or outside the computer-based electronic system.

In some example embodiments, the image signal processor 200B may be understood as an example of the image signal processor 200 of FIG. 1. Therefore, the same reference numerals are used for the same or substantially the same components as those described above, and redundant descriptions will be omitted.

Referring to FIGS. 6 and 7A together, the image signal processor 200B may detect a first edge A-A', at which an artifact has been generated, of the first estimated image 201 based on the artifact component. In some example embodiments, the artifact calculator 231 may set a first edge kernel 601 including the first edge A-A'. According to some example embodiments, the first edge kernel 601 is not limited to the shape illustrated in FIG. 7A and may be formed to have various sizes and shapes including the first edge A-A'.

In some example embodiments, the artifact calculator 231 may generate a first artifact value by raising an artifact component of a plurality of pixels, included in the first edge kernel 601, to a power. For example, the artifact calculator 231 may generate the first artifact value $D_{h,k}$ in a position k from artifact components using the following equation 3.

$$D_{h,k} = \sum_{i \in W} h_i f_{h,i}^n \quad \text{Equation 3}$$

$$\left( \sum_{i \in W} h_i = 1 \right)$$

($n$ is an even number)

$$D_{h,k} = \sum_{i \in W} h_i |f_{h,i}| \quad \text{Equation 4}$$

$$\left( \sum_{i \in W} h_i = 1 \right)$$

In some example embodiments, $f_{h,i}$ may be referenced as an artifact component detected in the first direction for each unit pixel included in the first estimated image 201. For example, the artifact calculator 231 may generate the first artifact value $D_{h,k}$ using a value obtained by squaring the artifact component $f_{h,i}$ detected in the first direction according to Equation 3. For example, the artifact calculator 231 may generate the first artifact value $D_{h,k}$ using an absolute value of the artifact component $f_{h,i}$ detected in the first direction according to Equation 4. Thus, the artifact calculator 231 may generate the first artifact value $D_{h,k}$ using a positive value generated from the artifact component $f_{h,i}$.

According to some example embodiments, the artifact calculator 231 may generate the first artifact value $D_{h,k}$ using the artifact component $f_{h,i}$ regardless of a sign thereof.

In some example embodiments, $h_i$ may be referenced as a weight applied to an artifact component of each pixel. In some example embodiments, i may refer to a location belonging to a region W centered on a location k.

Thus, the artifact calculator 231 may generate the first artifact value $D_{h,k}$ based on the first artifact component in the first direction.

Referring to FIG. 7B, the image signal processor 200B may detect a second edge B-B', at which an artifact is generated, of the second estimated image 202 based on an artifact component. In some example embodiments, the artifact calculator 231 may set the second edge kernel 602 including the second edge B-B'. In some example embodiments, the second edge kernel 602 is not limited to the illustrated shape, and may be formed to have various sizes and shapes including the second edge B-B'.

According to some example embodiments, the artifact calculator 231 may generate a second artifact value by raising an artifact component for a plurality of pixels, included in the second edge kernel 602, to a power. The artifact calculator 231 may generate a second artifact value $D_{v,k}$ in the location k from the artifact components using the following equation 5 or 6.

$$D_{v,k} = \sum_{i \in W} h_i f_{v,i}^n \quad \text{Equation 5}$$

$$\left( \sum_{i \in W} h_i = 1 \right)$$

($n$ is an even number)

$$D_{v,k} = \sum_{i \in W} h_i |f_{v,i}| \quad \text{Equation 6}$$

$$\left( \sum_{i \in W} h_i = 1 \right)$$

In some example embodiments, $f_{v,i}$ may be referenced as an artifact component detected in the second direction for each pixel included in the second estimated image 202. For example, the artifact calculator 231 may generate the second artifact value $D_{v,k}$ using a value obtained by squaring the artifact component $f_{v,i}$ detected in the second direction according to Equation 5. For example, the artifact calculator 231 may generate the second artifact value $D_{v,k}$ using an absolute value of the artifact component $f_{v,i}$ detected in the second direction according to Equation 6. Thus, the artifact calculator 231 may generate the second artifact value $D_{v,k}$ using a positive value generated from the artifact component $f_{v,i}$.

According to some example embodiments, the artifact calculator 231 may generate the second artifact value $D_{v,k}$ using the artifact component $f_{v,i}$ regardless of a sign thereof.

In some example embodiments, hi may be referenced as a weight applied to the artifact component of each pixel. In some example embodiments, i may refer to a location belonging to a region W centered on the location k.

Thus, the artifact calculator 231 may generate the second artifact values $D_{v,k}$ based on the second artifact component in the second direction.

According to some example embodiments, the weight calculator 232 may obtain a first weight based on at least a portion of the first artifact value $D_{h,k}$ and the second artifact value $D_{v,k}$. For example, the weight calculation unit 232 may obtain a ratio of the second artifact value $D_{v,k}$ to a sum of the first artifact value $D_{h,k}$ and the second artifact value $D_{v,k}$, as a first weight.

For example, the weight calculator 232 may obtain a first weight $w_{k1}$ in the location k, based on the following equation 7.

$$w_{k1} = \frac{D_{v,k}}{D_{h,k} + D_{v,k}} \qquad \text{Equation 7}$$

According to some example embodiments, the weight calculator 232 may obtain the first weight $w_{k1}$ in the position k according to the following equation 8.

$$w_{k1} = \alpha_1 D_{h,k}^2 + \alpha_2 D_{h,k} D_{v,k} + \alpha_3 D_{v,k}^2 + \alpha_4 D_{h,k} + \alpha_5 D_{v,k}^2 + \alpha_6 \qquad \text{Equation 8}$$

For example, the weight calculator 232 may obtain the first weight $w_{k1}$ in the position k using a second regression model such as Equation 8. In some example embodiments, $\alpha_1$, $\alpha_2$, $\alpha_3$, $\alpha_4$, $\alpha_5$, and $\alpha_6$ in Equation 8 may be referred to as predetermined coefficients to obtain the first weight $w_{k1}$. For example, each of $\alpha_1$, $\alpha_2$, $\alpha_3$, $\alpha_4$, $\alpha_5$, and $\alpha_6$ may be referred to as a coefficient applied to an artifact value.

According to some example embodiments, the weight calculator 232 may obtain the first weight $w_{k1}$ in the position k according to at least a portion of the following equations 9 and 10.

$$w_{k1} = b_1 D_{h,k} + b_2 D_{v,k} + b_3 \qquad \text{Equation 9}$$

$$w_{k1} = \begin{cases} 0 & w < 0 \\ 1 & w > 1 \\ w & \text{otherwise} \end{cases} \qquad \text{Equation 10}$$

For example, the weight calculator 232 may obtain the first weight $w_{k1}$ in the position k using a second regression model such as Equation 8. In some example embodiments, $b_1$, $b_2$, and $b_3$ may be referred to as predetermined coefficients to obtain the first weight $w_{k1}$.

In some example embodiments, the weight calculator 232 may obtain, using Equation 10, only a first weight $w_{k1}$ having a value between 0 to 1, among the first weights $w_{k1}$ obtained through Equation 8 or Equation 9.

In some example embodiments, the weight calculator 232 may obtain a ratio of the first artifact value $D_{h,k}$ to a sum of the first artifact value $D_{h,k}$ and the second artifact value $D_{v,k}$, as a second weight. For example, the weight calculator 232 may obtain a second weight $w_{k2}$ based on the following equation 11.

$$w_{k2} = \frac{D_{h,k}}{D_{h,k} + D_{v,k}} \qquad \text{Equation 11}$$

In some example embodiments, the weight calculation unit 232 may obtain a value, obtained by subtracting the first weight from a predetermined value (for example, "1"), as the second weight. For example, the weight calculator 232 may obtain the second weight $w_{k2}$ based on the following equation 12.

$$w_{k2} = 1 - w_{k1} \qquad \text{Equation 12}$$

Through the above-described example embodiments, the image signal processor 200B may generate an artifact value having a positive value from artifact components obtained from the estimated images 201 and 202. In some example embodiments, the image signal processor 200B may obtain the first weight and the second weight using predetermined equations from the generated artifact values.

For example, the image signal processor 200B may obtain a weight for each estimated image 201 or 202 based on a degree of generation of an artifact in each estimated image 201 or 202.

Thus, the image signal processor 200B may increase the quality (for example, resolution) of an output image.

Figure 8:
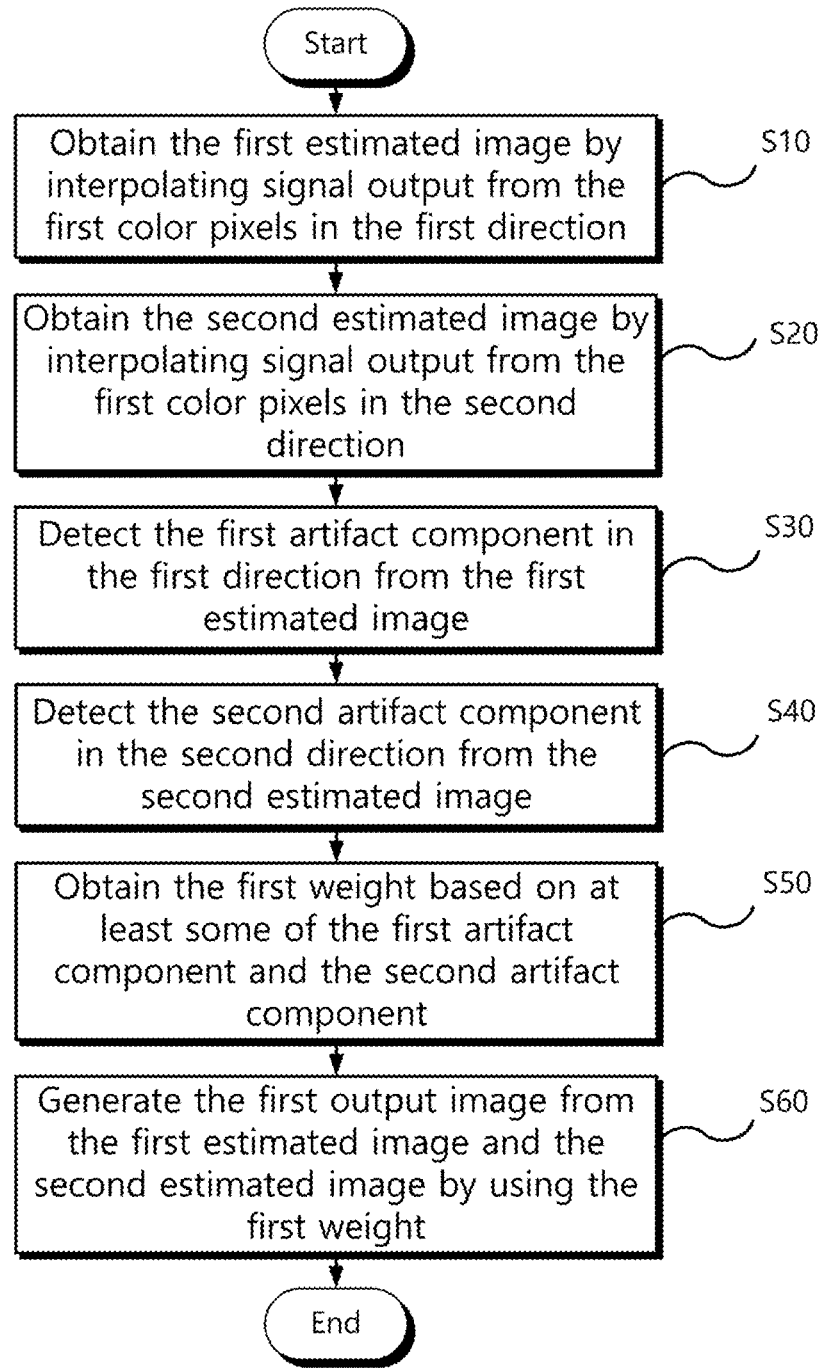
FIG. 8 is a flowchart illustrating an example of an operation in which an image signal processor according to some example embodiments generates a first output image.

FIG. 8 is a flowchart illustrating an example of an operation in which an image signal processor according to some example embodiments generates a first output image.

Referring to FIG. 8, the image signal processor 200B may interpolate input image data in a predetermined direction. In some example embodiments, the image signal processor 200B may detect an artifact based on the interpolation to generate a weight. In some example embodiments, the image signal processor 200B may generate an output image using the generated weight.

In operation S10, the image signal processor 200B (or the interpolation unit 210) according to some example embodiments may interpolate signals, output from first color pixels, in a predetermined first direction to obtain the first estimated image 201.

For example, the image signal processor 200B may estimate a first color value through the interpolation in the predetermined first direction with respect to data of pixels, other than the first color pixels, among a plurality of pieces of pixel data of the input image data.

For example, the image signal processor 200B may identify a first pixel, among pixels other than the first color pixels, from the input image data. In some example embodiments, the image signal processor 200B may estimate a first color value in the first pixel using a signal output from the first pixel, among the first color pixels, and least a portion of pixels arranged in the first direction.

Accordingly, the image signal processor 200B may obtain the first estimated image 201, including pixels having a specific color value (for example, a G color value), through the interpolation in the first direction.

In operation S20, the image signal processor 200B may interpolate signals, output from the first color pixels, in a second direction intersecting the first direction to obtain the second estimated image 202.

However, in some example embodiments, operation S20 in which the image signal processor 200B generates the second estimated image 202 through the interpolation in the second direction may be understood to be substantially the same as operation S10 in which the image signal processor 200B generates the first estimated image 201 through the interpolation in the first direction. Therefore, a description overlapping the foregoing description will be omitted.

Accordingly, in some example embodiments, the image signal processor 200B may obtain the second estimated image 202, including pixels having a specific color value (for example, a G color value), through the interpolation in the second direction.

According to some example embodiments, operation S10 and operation S20 may be simultaneously performed, or the order may be reversed so that operation S10 is performed after operation S20.

In operation S30, the image signal processor 200B (or the artifact detector 220) may detect the first artifact component from data of pixels, included in the first estimated image 201, in the first direction.

For example, the image signal processor 200B may set a kernel, including a plurality of pixels arranged in the second direction, of the first estimated image 201. In some example embodiments, the image signal processor 200B may apply a predetermined filter (for example, a Laplacian operator) to the set kernel. Also, in some example embodiments, the image signal processor 200B may sequentially apply the filter to the plurality of pixels arranged in the second direction while moving from the kernel in the first direction on the first estimated image 201.

Thus, the image signal processor 200B may detect the first artifact component in the first direction as a result of applying the predetermined filter to the plurality of pixels.

In operation S40, the image signal processor 200B (or the artifact detector 220 may detect a second artifact component from data of pixels, included in the second estimated image 202, in the second direction.

For example, the image signal processor 200B may set a kernel, including a plurality of pixels arranged in the first direction, of the second estimated image 202. In some example embodiments, the image signal processor 200B may apply a predetermined filter to the set kernel. Also, in some example embodiments the image signal processor 200B may sequentially apply the filter to the plurality of pixels, arranged in the first direction, while moving from the kernel in the second direction on the second estimated image 202.

Thus, the image signal processor 200B may detect the second artifact component in the second direction as a result of applying the predetermined filter to the plurality of pixels.

According to some example embodiments, operation S30 may be performed subsequently to operation S10. In some example embodiments, operation S40 may be performed subsequently to operation S20. According to some example embodiments, operation S30 and operation S40 may be simultaneously performed, or the order may be reversed so that operation S30 is performed after operation S40.

In operation S50, the image signal processor 200B (or the calculation unit 230) may obtain a first weight based on at least a portion of the first artifact component and the second artifact component.

For example, the image signal processor 200B (or the artifact calculator 231) may generate a first artifact value from the first artifact component using a predetermined equation. For example, the image signal processor 200B may generate the first artifact value by summing results obtained by raising at least a portion of the first artifact component to a power.

In some example embodiments, the image signal processor 200B (or the artifact calculator 231) may generate the second artifact value from the second artifact component using a predetermined equation. For example, the image signal processor 200B may generate the second artifact value by summing results obtained by raising at least a portion of the second artifact component to a power.

In some example embodiments, the image signal processor 200B (or the weight calculator 232) may obtain a ratio of the second artifact value to a sum of the first artifact value and the second artifact value, as a first weight. In some example embodiments, the image signal processor 200B may obtain a ratio of the first artifact value to the sum of the first artifact value and the second artifact value, as a second weight.

In operation S60, the image signal processor 200B (or the image generator 240) may generate a first output image from the first estimated image 201 and the second estimated image using the first weight.

For example, the image signal processor 200B may generate the first output image by combining the first estimated image 201, to which the first weight is applied, and the second estimated image 202 to which the second weight obtained from the first weight is applied. For example, the image signal processor 200B may generate the first output image using the following equation 13.

$$G_k = w_{k1} G_{h,k} + (1-w_{k1}) G_{v,k} \qquad \text{Equation 13}$$

In some example embodiments, $w_{k1}$ may be understood as the first weight obtained by the artifact values. In some example embodiments, $G_{h,k}$ may be understood as a first color value of pixels included in the first estimated image 201. In some example embodiments, $G_{v,k}$ may be understood as a first color value of pixels included in the second estimated image 202. In some example embodiments, $G_k$ may be understood as a first color value of pixels included in the first output image.

In some example embodiments, the first output image may include unit pixels having a specific color value (for example, a G color value). For example, the first output image may include unit pixels having a color value generated through a weighted average between the first color value of the pixels included in the first estimated image 201 and the first color value of the pixels included in the second estimated image.

As described above, the image signal processor 200B according to some example embodiments may generate a first output image restored through an operation including interpolation in a predetermined direction on a specific color pixel (for example, a G pixel) of input image data.

Thus, the image signal processor 200B according to some example embodiments may simplify an operation for restoration of the image data. As a result, the image signal processor 200B may save power consumed in an operation for restoration of the image data. In some example embodiments, the image signal processor 200B may improve quality of an image obtained by restoring the image data.

In addition, the image signal processor 200B according to some example embodiments may generate a first output image by reflecting (or selecting) a component (or color values), having less side effect, of the first estimated image 201 or the second estimated image 202 obtained through interpolation in a specified direction.

Thus, the image signal processor 200B according to some example embodiments may mitigate crosstalk occurring when unit pixels having different color values are disposed adjacent to each other.

Figure 9:
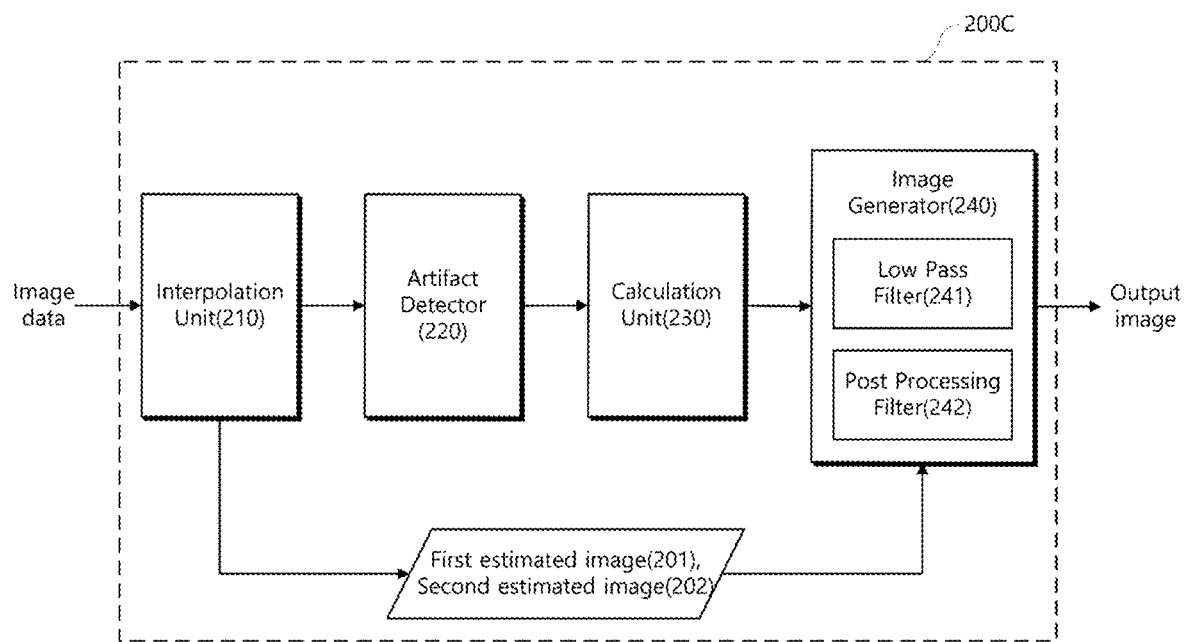
FIG. 9 is a block diagram illustrating an image signal processor according to some example embodiments.
Figure 10:
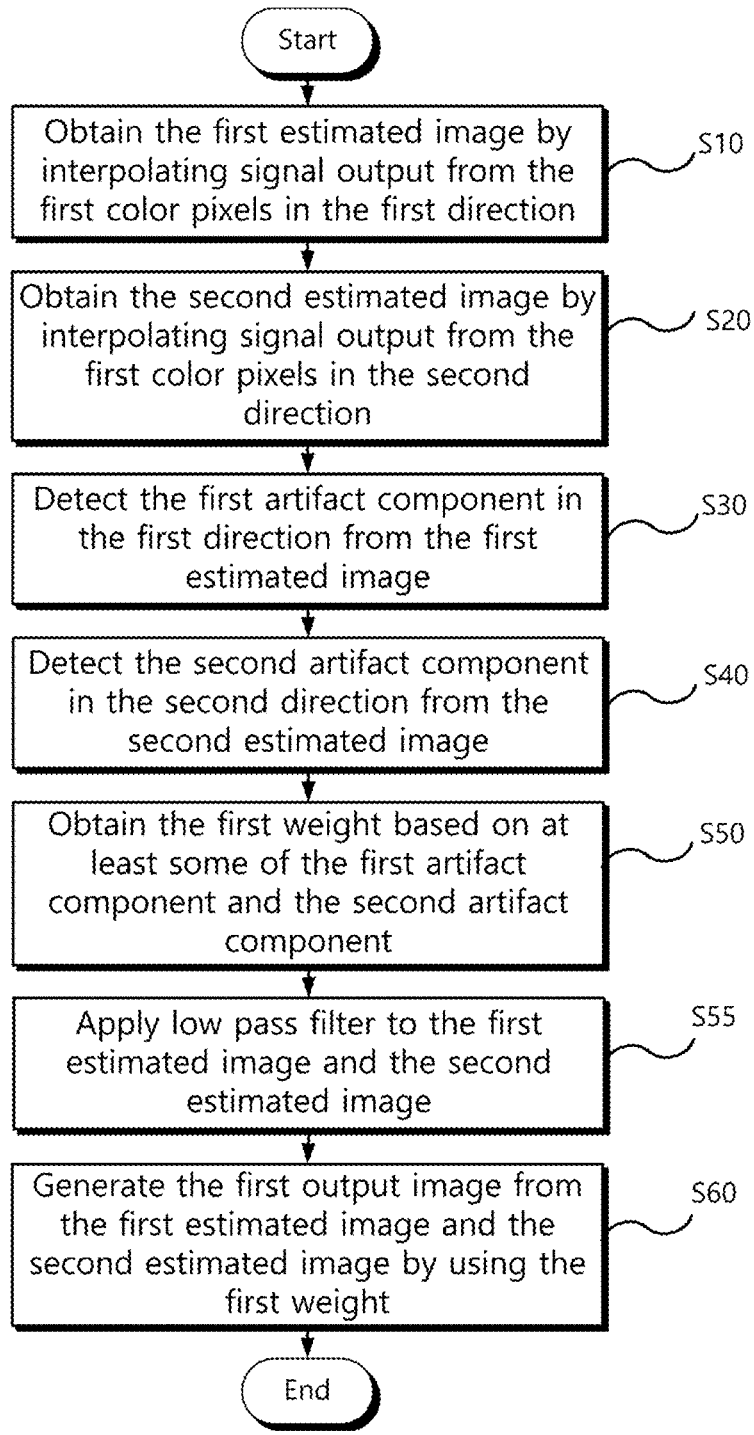
FIG. 10 is a flowchart illustrating an example of an operation in which the image signal processor of FIG. 9 generates a first output image according to some example embodiments.
Figure 11:
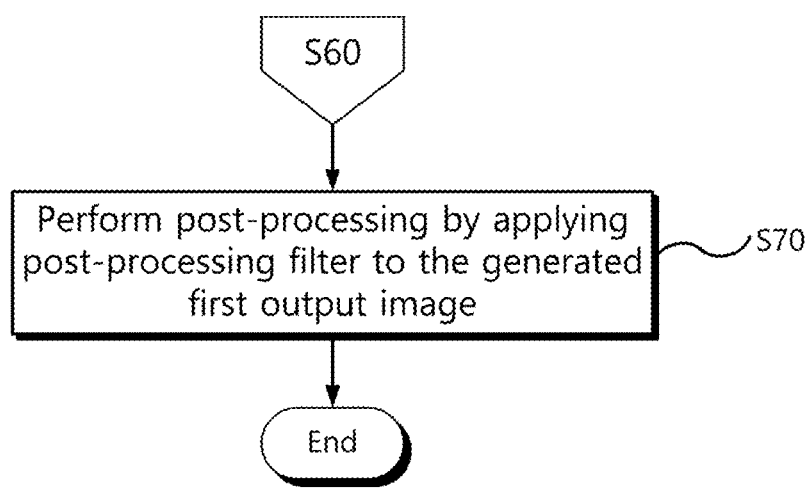
FIG. 11 is a flowchart illustrating an example of an operation in which the image signal processor of FIG. 9 performs post-processing on a first output image according to some example embodiments.

FIG. 9 is a block diagram illustrating an image signal processor 200C according to some example embodiments. FIG. 10 is a flowchart illustrating an example of an operation in which the image signal processor of FIG. 9 generates a first output image according to some example embodiments. FIG. 11 is a flowchart illustrating an example of an operation in which the image signal processor of FIG. 9 performs post-processing on a first output image according to some example embodiments.

Referring to FIG. 9, an image generator 240 of the image signal processor 200C according to some example embodiments may further include a low pass filter (LPF) 241, removing noise from estimated images 201 and 202, and a post-processing filter 242 performing post-processing on a first output image.

According to some example embodiments, the low pass filter 241 and the post-processing filter 242 may be formed within the image signal processor 200C, separately from the image generator 240.

Referring to FIGS. 9 and 10 together, the image signal processor 200C according to some example embodiments may generate a first output image, including pixels having a specific color value, using an operation including interpolation in a predetermined direction.

In some example embodiments, the image signal processor 200C may be understood as an example of the image signal processor 200 of FIG. 1. In some example embodiments, the operations performed in operations S10 to S50 of FIG. 10 may be understood to be substantially the same as the operations performed in operations S10 to S50 of FIG. 8.

Therefore, the same reference numerals are used for the same or substantially the same components as those described above, and redundant descriptions will be omitted.

In operation S55, the image signal processor 200C may apply the low pass filter 241 to at least a portion of the first estimated image 201 and the second estimated image 202. Thus, the image signal processor 200C may remove high-frequency noise included in each of the first estimated image 201 and the second estimated image 202.

In some example embodiments, the low pass filter 241 may be implemented as, for example, a circuit including at least one resistor and at least one capacitor element. In some example embodiments, the low pass filter 241 may be represented as a matrix having predetermined size and arrangement. However, the configuration and representation of the low pass filter 241 are not limited to the above-described example embodiments.

In operation S60, the image signal processor 200C may generate a first output image by combining the first estimated image, to which a first weight is applied, and the second estimated image 202 to which a second weight is applied.

For example, the image signal processor 200C may apply the first weight to the first estimated image 201 which has passed through the low pass filter 241. In some example embodiments, the image signal processor 200C may apply the second weight to the second estimated image 202 which has passed through the low pass filter 241. Furthermore, in some example embodiments, the image signal processor 200C may generate the first output image by combining the first estimated image, to which the first weight is applied, and the second estimated image 202 to which the second weight is applied.

As described above, the image signal processor 200C according to some example embodiments may generate the first output image by applying weights to the estimated images 201 and 202 from which noise has been removed through the low pass filter 241.

Through the above-described configuration, the image signal processor 200C according to some example embodiments may improve quality of the first output image generated by combining the first estimated image 201 and the second estimated image 202.

Referring to FIGS. 9 to 11, the image signal processor 200C according to some example embodiments may perform post-processing on the first output image using the post-processing filter 242.

In operation S70, the image signal processor 200C may apply the post-processing filter 242 to the generated first output image to perform post-processing.

For example, the image signal processor 200C may apply a sharpening filter to the first output image to amplify an edge component included in the first output image. Thus, the image signal processor 200C may emphasize an edge (or an edge region) of the first output image.

In some example embodiments, the image signal processor 200C may apply an average filter to the generated first output image to secure average data of color values included in the first output image.

However, the type of post-processing filter 242 and the type of post-processing operation using the post-processing filter 242 are not limited to the above-described example embodiments and may be understood as various processing schemes applied to the generated first output image.

Through the above-described configuration, the image signal processor 200C according to some example embodiments may improve the quality of the first output image.

Figure 12:
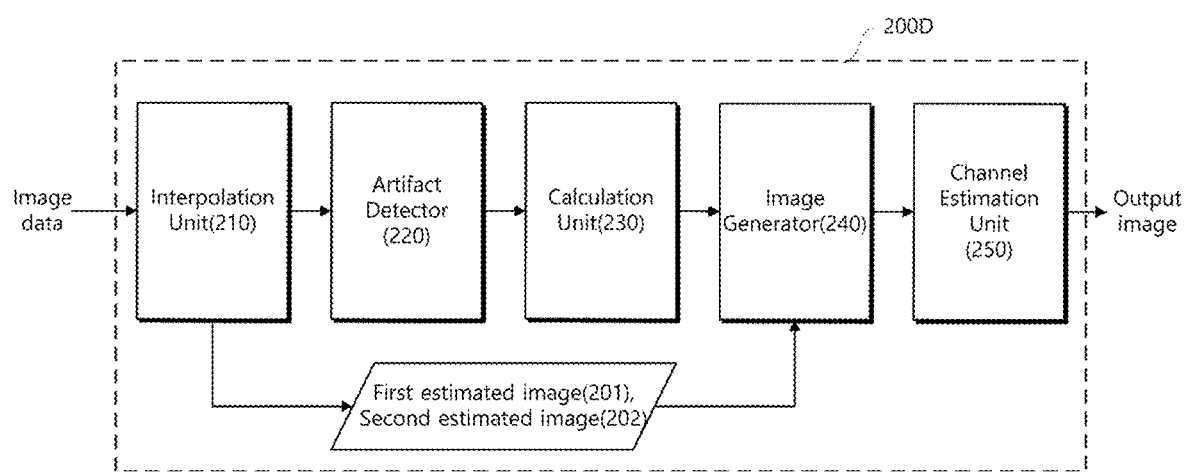
FIG. 12 is a block diagram of an image signal processor according to some example embodiments.
Figure 13:
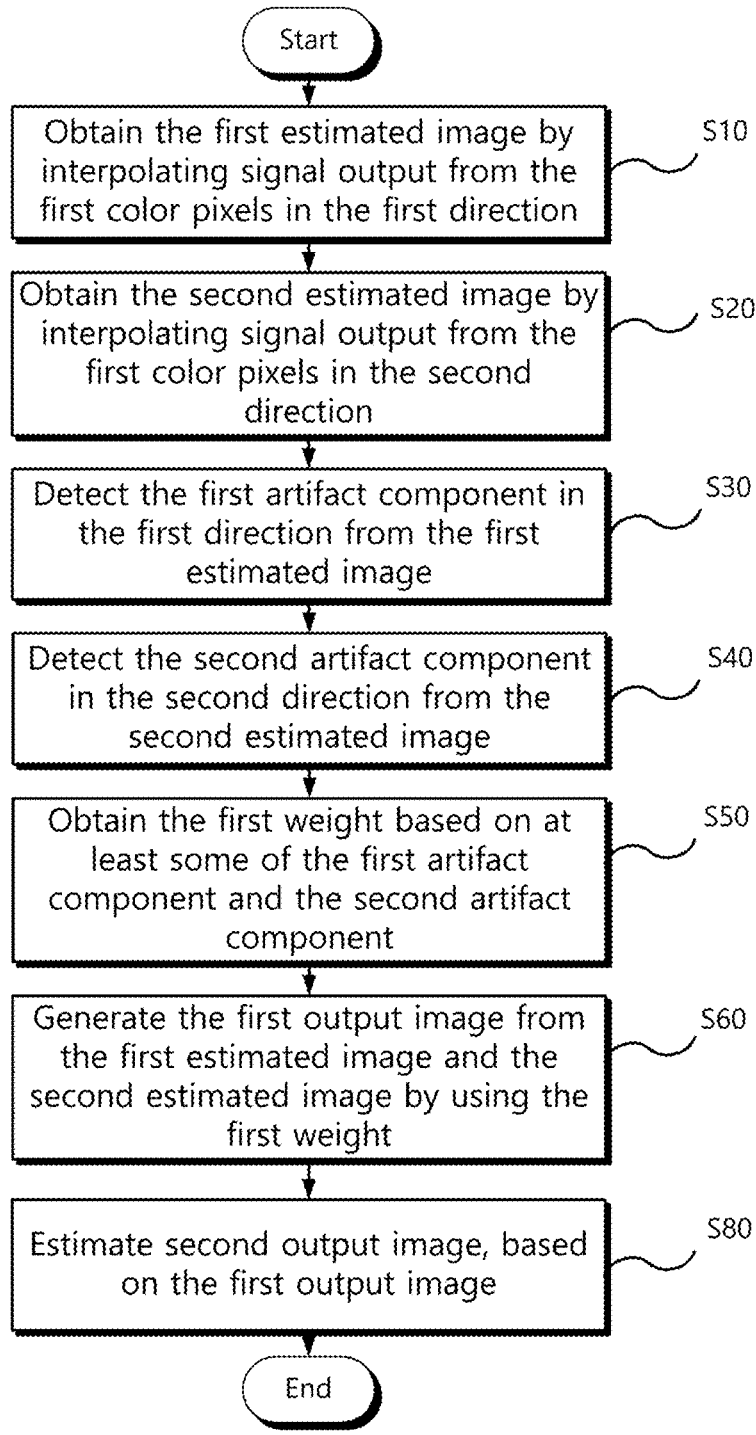
FIG. 13 is a flowchart illustrating an example of an operation in which the image signal process of FIG. 12 estimates a second output image from a first output image according to some example embodiments.

FIG. 12 is a block diagram of an image signal processor 200D according to some example embodiments. FIG. 13 is a flowchart illustrating an example of an operation in which the image signal process of FIG. 12 estimates a second output image from a first output image according to some example embodiments. FIG. 14A is a diagram illustrating an example of a second output image estimated from a first output image by an image signal processor according to some example embodiments. FIG. 14B is a diagram illustrating another example of a second output image estimated from a first output image by an image signal processor according to some example embodiments.

Referring to FIG. 12, the image signal processor 200D according to some example embodiments may further include a channel estimation unit 250 estimating data of second color pixels or third color pixels from a first output image. In some example embodiments, the image signal processor 200D may be understood as an example of the image signal processor 200 of FIG. 1. In some example embodiments, at least a part of the channel estimation unit 250 may include or be implemented as respective processing circuitry such as hardware (e.g., logic circuits) or a combination of hardware and software (e.g., a computer-based electronic system) like a processor executing instruction codes or program routines (e.g., a software program). The instruction codes or the program routines may be stored in any storage device located inside or outside the computer-based electronic system.

In some example embodiments, operations performed in operation S10 to operation S60 of FIG. 13 are understood to be substantially the same as the operations performed in operation S10 to operation S60 of FIG. 8. Therefore, the same reference numerals are used for the same or substantially the same components as those described above, and redundant descriptions will be omitted.

Referring to FIG. 13, in operation S80, the image signal processor 200D (or a channel estimation unit 250) according to some example embodiments may estimate a second output image based on a first output image.

For example, the image signal processor 200D (or the channel estimation unit 250) may estimate second color values of unit pixels included in image data based on the first output image.

For example, the channel estimation unit 250 may estimate a second color value of pixels other than second color pixels, among unit pixels of the image data, using a first color value of unit pixels included in the first output image and a second color value of the second color pixels.

Thus, referring to FIG. 14A, the image signal processor 200D may obtain a second output image 1401 including unit pixels having a second color value (for example, an R color value).

In some example embodiments, as an example, the channel estimation unit 250 may apply guided upsampling to data of pixels included in the first output image and data of the second color pixels to estimate the second color value of the pixels, other than the second color pixels, among the plurality of unit pixels.

In some example embodiments, the guided upsampling may be understood as a technique for estimating a second color value of pixels, other than the second color pixels, from data of the second color pixels based on arrangement or tendency of arrangement of data of pixels included in the first output image.

In some example embodiments, the channel estimation unit 250 may apply color-difference interpolation to data of the pixels included in the first output image and data of the second color pixels to estimate a second color value of pixels, other than the second color pixels, among the plurality of unit pixels.

In some example embodiments, the color-difference interpolation may be understood as a technique for performing interpolation using data obtained by subtracting data of pixels, included in the first estimated image, from the second color value of the second color pixels.

However, the technique for the channel estimation unit 250 to estimate the second color value of the unit pixels is not limited to the above-described example embodiments and may be referenced to, for example, joint bilateral upsampling, or the like.

Furthermore, in some example embodiments, the image signal processor 200D may estimate a third color value of pixels, other than third color pixels, among the plurality of unit pixels, through the channel estimation unit 250 based on at least a portion of the first output image or the second output image.

Thus, the image signal processor 200D may obtain a third output image including unit pixels having a third color value (for example, a B color value).

In some example embodiments, an operation in which the image signal processor 200D estimates the third color value for at least a portion of the unit pixels may be understood to be substantially the same as the operation in which the image signal processor 200D estimates the second color value for at least a portion of the unit pixels, as described above. Therefore, a description overlapping the foregoing description will be omitted.

Furthermore, in some example embodiments, the image signal processor 200D may combine the first output image, the second output image, and the third output image. Thus, the image signal process 200D may generate an output image obtained by restoring the input image data.

As described above, the image signal processor 200D according to some example embodiments may perform a de-mosaicing operation on the input image data through a simple operation including interpolation in a specified direction.

On the other hand, referring to FIG. 14B, in some example embodiments, the image signal processor 200D (or the channel estimation unit 250) may estimate a second color value of second color pixels depending on a specific pattern (for example, a GRGB Bayer pattern), among a plurality of unit pixels, based on the first output image.

For example, the image signal processor 200D may generate a first output image including unit pixels having a first color value from input image data. In some example embodiments, the image signal processor 200D may estimate a second color value of a point, at which second color pixels (for example, $R_{i-3,j-2}$, $R_{i-1,j}$, $R_{i+1,j+4}$, $R_{i+3,j+2}$, or the like) are disposed according to a specific pattern, based on the first color value of the unit pixels included in the first output image.

For example, the image signal processor 200D may estimate R color values of R pixels ($R_{i-3,j-2}$, $R_{i-3,j}$, $R_{i+1,j-2}$, $R_{i+3,j}$, or the like), disposed according to a GRGB Bayer pattern, based on G color values of pixels included in the first output image.

In some example embodiments, for example, the image signal processor 200D may utilize one of the above-described guided upsampling, color-difference interpolation, and joint bilateral upsampling, but example embodiments are not limited thereto.

Also, in some example embodiments, the image signal processor 200D may estimate the third color value at a point, at which the third color pixels are disposed according to a specific pattern, based on the first color value of the pixels included in the first output image.

For example, the image signal processor 200D may estimate B color values at a point, at which B color pixels are disposed according to a GRGB Bayer pattern, based on a G color value of the pixels included in the first output image.

Thus, the image signal processor 200D may generate an output image having a specified pattern (for example, an RGBG pattern) from the input image data.

For example, the image signal processor 200D may generate a first output image including unit pixels having a first color value from the input image data. Furthermore, in some example embodiments the image signal processor 200D may estimate a second color value and a third color value depending on a specific pattern from the first output image. Thus, the image signal processor 200D may generate an output image having the specified pattern.

In some example embodiments, the output image may be referenced as an image mosaiced according to a specific pattern based on the input image data.

According to the above-described configuration, the image signal processor 200D according to some example embodiments may perform a mosaicing operation to generate an image, mosaiced according to a specific pattern, from input image data.

Thus, the image signal processor 200D may simplify an operation for mosaicing. In some example embodiments, the image signal processor 200D may significantly reduce power consumed in the operation for mosaicing.

As described above, the image signal processor according to some example embodiments may simplify an operation of interpolating (or demosaicing) input image.

In addition, the image signal processor according to some example embodiments may significantly reduce (or may save) power consumed in an operation of demosaicing input image data.

In addition, the image signal processor according to some example embodiments may improve quality (for example, resolution) of an output image obtained by demosaicing input image data.

As set forth above, an image signal processor according to some example embodiments may restore input image data using an operation including interpolation in a specified direction. As a result, the image signal processor may save power consumed to restore the image data.

While the inventive concepts have been shown and described with reference to some example embodiments thereof, it will be apparent to those skilled in the art that various modifications and variations in form and details may be made therein without departing from the spirit and scope of the following claims.

What is claimed is:

1. An image processing method of an image signal processor, the image processing method comprising:
   obtaining a first estimated image by interpolating signals output from first color pixels, among a plurality of unit pixels included in a pixel array, in a first direction;
   obtaining a second estimated image by interpolating the signals output from the first color pixels in a second direction, intersecting the first direction;
   detecting a first artifact component in the first direction with respect to pixels included in the first estimated image;
   detecting a second artifact component in the second direction with respect to pixels included in the second estimated image;
   obtaining a first weight based on at least a portion of the first artifact component and the second artifact component; and
   generating a first output image from the first estimated image and the second estimated image using the first weight.

2. The image processing method of claim 1, wherein the obtaining the first estimated image by interpolating the signals output from the first color pixels comprises:
   identifying a first pixel, among pixels other than the first color pixels, from the plurality of unit pixels; and
   estimating a first color value in the first pixel using a signal output from at least a portion of pixels arranged in the first direction with respect to the first pixel, among the first color pixels.

3. The image processing method of claim 1, wherein the detecting the first artifact component comprises:
   setting a first kernel, comprising a plurality of pixels arranged in the second direction, of the first estimated image; and
   applying a filter to the first kernel to detect the first artifact component.

4. The image processing method of claim 3, wherein the obtaining the first weight further comprises,
   generating a first artifact value from the first artifact component using an equation;
   generating a second artifact value from the second artifact component using the equation; and
   obtaining the first weight based on the first artifact value and the second artifact value, and
   the image processing method further comprises,
   obtaining a second weight based on the first weight.

5. The image processing method of claim 4, further comprising:
   generating the first output image from the first estimated image and the second estimated image using at least one weight having a value within a range, among first weights.

6. The image processing method of claim 5, wherein the generating the first output image comprises:
   applying the first weight to the first estimated image;
   applying the second weight to the second estimated image; and
   generating the first output image by combining the first estimated image, to which the first weight is applied, and the second estimated image to which the second weight is applied.

7. The image processing method of claim 4, wherein the generating the first artifact value from the first artifact component comprises:
   detecting a first edge of the first estimated image based on the first artifact component;
   setting a first edge kernel comprising the first edge of the first estimated image; and
   generating the first artifact value by raising an artifact component for at least a portion of a plurality of pixels, included in the first edge kernel, to a power.

8. The image processing method of claim 1, wherein the pixel array comprises second color pixels having a smaller number than the first color pixels and having a second color value, and
   the image processing method further comprises:
   outputting a second output image comprising unit pixels having the second color value on the pixel array based on the first output image.

9. An image signal processor comprising:
   processing circuitry configured to
      interpolate signals output from first color pixels, among a plurality of unit pixels included in a pixel array, in a first direction to obtain a first estimated image and to interpolate the signals in a second direction, intersecting the first direction, to obtain a second estimated image;
      detect a first artifact component in the first direction with respect to pixels included in the first estimated image and to detect a second artifact component in the second direction with respect to pixels included in the second estimated image;
      obtain a first weight using the first artifact component and the second artifact component; and
      generate a first output image from the first estimated image and the second estimated image using the first weight.

10. The image signal processor of claim 9, wherein the processing circuitry is configured to:
    identify a first pixel, among pixels other than the first color pixels, from the plurality of unit pixels; and
    estimate a first color value of the first pixel using a signal output from at least a portion of pixels arranged in the first direction with respect to the first pixel, among the first color pixels.

11. The image signal processor of claim 9, wherein
the processing circuitry is, in response to the obtaining the first estimated image, configured to:
set a first kernel comprising a plurality of pixels, arranged in the second direction, of the first estimated image; and
apply a filter to the first kernel to detect the first artifact component.

12. The image signal processor of claim 11, wherein
the processing circuitry is further configured to:
generate a first artifact value from the first artifact component using an equation and to generate a second artifact value from the second artifact component using the equation; and
obtain the first weight from a ratio of the second artifact value to a sum of the first artifact value and the second artifact value.

13. The image signal processor of claim 12, wherein
the processing circuitry is configured to:
obtain a second weight from a ratio of the first artifact value to the sum of the first artifact value and the second artifact value;
apply the first weight to the first estimated image and apply the second weight to the second estimated image; and
generate the first output image by combining the first estimated image, to which the first weight is applied, and the second estimated image to which the second weight is applied.

14. The image signal processor of claim 13, wherein
the processing circuitry further comprises a post-processing filter configured to adjust pixel data of the first output image and apply the post-processing filter to the first output image.

15. The image signal processor of claim 12, wherein
the processing circuitry is configured to:
detect a first edge of the first estimated image based on the first artifact component;
set a first edge kernel comprising the first edge of the first estimated image; and
generate the first artifact value by raising an artifact component for at least a portion of a plurality of pixels, included in the first edge kernel, to a power.

16. The image signal processor of claim 9, wherein
the pixel array comprises second color pixels having a smaller number than the first color pixels, and
the processing circuitry is further configured to estimate a second output image comprising pixels having a second color value on the pixel array based on the first output image.

17. The image signal processor of claim 13, wherein
the processing circuitry further comprises a low pass filter (LPF), and
the processing circuitry is configured to apply the first weight to the first estimated image after applying the low pass filter to the first estimated image and apply the second weight to the second estimated image after applying the low pass filter to the second estimated image.

18. An image processing device comprising an image signal processor, the image processing device comprising:
processing circuitry configured to
interpolate signals output from first color pixels, among a plurality of unit pixels included in a pixel array, in a first direction to obtain a first estimated image and to interpolate the signals in a second direction, intersecting the first direction, to obtain a second estimated image;
detect a first artifact component of the first estimated image in the first direction and to detect a second artifact component of the second estimated image in the second direction;
obtain a first weight using the first artifact component and the second artifact component; and
generate a first output image from the first estimated image and the second estimated image using the first weight.

19. The image processing device of claim 18, wherein
the processing circuitry is configured to:
identify a first pixel, among pixels other than the first color pixels, from the plurality of unit pixels; and
estimate a first color value in the first pixel using a signal output from at least a portion of pixels arranged in the first direction with respect to the first pixel, among the first color pixels.

20. The image processing device of claim 18, wherein
the processing circuitry is configured to:
generate a first artifact value from the first artifact component using the equation and generate a second artifact value from the second artifact component using the equation;
obtain the first weight from a ratio of the second artifact value to a sum of the first artifact value and the second artifact value; and
obtain a second weight from a ratio of the first artifact value to the sum of the first artifact value and the second artifact value, and
the processing circuitry is further configured to generate the first output image based on the first estimated image, to which the first weight is applied, and the second estimated image to which the second weight is applied.

* * * * *